United States Patent
Uchiyama et al.

(10) Patent No.: US 9,117,137 B2
(45) Date of Patent: Aug. 25, 2015

(54) VISUAL INSPECTION DEVICE, VISUAL INSPECTION METHOD, AND COMPUTER PROGRAM

(71) Applicant: Keyence Corporation, Osaka (JP)

(72) Inventors: Naoya Uchiyama, Osaka (JP); Hidetoshi Morimoto, Osaka (JP)

(73) Assignee: Keyence Corporation, Osaka (JP)

(*) Notice: Subject to any disclaimer, the term of this patent is extended or adjusted under 35 U.S.C. 154(b) by 237 days.

(21) Appl. No.: 13/705,275

(22) Filed: Dec. 5, 2012

(65) Prior Publication Data
US 2013/0170734 A1    Jul. 4, 2013

(30) Foreign Application Priority Data
Dec. 28, 2011   (JP) ................... 2011-289940

(51) Int. Cl.
*G06K 9/00*   (2006.01)
*G06K 9/46*   (2006.01)
*G06T 7/00*   (2006.01)

(52) U.S. Cl.
CPC ............ *G06K 9/46* (2013.01); *G06T 7/0004* (2013.01)

(58) Field of Classification Search
CPC ............. G06T 7/0004; G01N 2021/8887; G01N 21/8851; G06K 9/46
USPC ......... 382/149, 263, 128, 254, 260, 100, 151, 382/287, 294
See application file for complete search history.

(56) References Cited

U.S. PATENT DOCUMENTS

| | | | |
|---|---|---|---|
| 8,391,585 B2 * | 3/2013 | Kuchii | 382/141 |
| 2003/0202703 A1 * | 10/2003 | Ogi | 382/224 |
| 2009/0279772 A1 * | 11/2009 | Sun et al. | 382/141 |

FOREIGN PATENT DOCUMENTS

| | | |
|---|---|---|
| JP | 2003-317082 | 11/2003 |
| JP | 2005-265661 | 9/2005 |

* cited by examiner

*Primary Examiner* — Mike Rahmjoo
(74) *Attorney, Agent, or Firm* — Kilyk & Bowersox, P.L.L.C.

(57) ABSTRACT

Inputs of a plurality of images constituting a group of images of items regarded as non-defective items are previously accepted and stored, and a defect threshold for detecting a defective portion of an inspection object is set based on the plurality of stored images. A defect amount to be compared with a determination threshold for making a non-defective/defective determination on the inspection object is calculated with respect to each of the plurality of stored images based on the set defective threshold, and whether or not each of the calculated defect amounts is an outlier is tested by use of at least one of a parametric technique and a non-parametric technique. Outlier information for specifying an image whose defect amount has been tested to be the outlier is displayed and outputted.

18 Claims, 22 Drawing Sheets

VISUAL INSPECTION DEVICE, VISUAL INSPECTION METHOD, AND COMPUTER PROGRAM

CROSS-REFERENCE TO RELATED APPLICATIONS

The present application claims foreign priority based on Japanese Patent Application No. 2011-289940, filed Dec. 28, 2011, the contents of which is incorporated herein by reference.

BACKGROUND OF THE INVENTION

1. Field of the Invention

The present invention relates to a visual inspection device, a visual inspection method, and a computer program which are capable of eliminating an image of a defective item from a group of stored images of items regarded as non-defective items out of images acquired by capturing inspection objects.

2. Description of Related Art

There has hitherto been developed a visual inspection method in which an image acquired by capturing an inspection object is compared with an image (standard image) of an inspection object to serve as a standard, to thereby determine whether or not the inspection object is a non-defective item. The image to serve as the standard for the determination is an image of an item determined as a non-defective item by visual inspection, and a determination threshold for the non-defective/defective determination is set, using as the standard the image of an item determined as a non-defective item.

In order to correctly determine a non-defective item as a non-defective item, setting an appropriate determination threshold for the non-defective/defective determination is important. For example, Japanese Unexamined Patent Publication No. 2005-265661 discloses an image inspection device using an image processing method of inputting a plurality of non-defective item images to set a threshold for making a non-defective/defective determination on an image of an inspection object. In Japanese Unexamined Patent Publication No. 2005-265661, learning is performed each time a non-defective item image is added, and the threshold for the non-defective/defective determination is reset, and hence an appropriate threshold can be set even when slight variations in non-defective/defective determination have occurred.

However, there has been a problem with the image inspection device using the image processing method disclosed in Japanese Unexamined Patent Publication No. 2005-265661 in that, when an image of a defective item erroneously becomes a learning object for setting the threshold, the probability of erroneously judging a non-defective item as a defective item increases, which might cause deterioration in defect detection accuracy. Conventionally, in order to avoiding mixture of an image of a defective item, the user has visually checked an image of an item and eliminated the image determined as a defective item, but visually checking all images is a very complicated operation.

SUMMARY OF THE INVENTION

The present invention has been made in view of the above circumstances, and has an object to provide a visual inspection device, a visual inspection method and a computer program which are capable of preventing mixture of an image of a defective item into an image group to serve as a standard for setting a determination threshold for a non-defective/defective determination, and further preventing deterioration in inspection accuracy.

In order to achieve the above object, according to one embodiment of the invention, there is provided a visual inspection device which compares a captured image of an inspection object with a group of images of items regarded as non-defective items to make a non-defective/defective determination, the device including: an image inputting unit for accepting inputs of a plurality of images constituting a group of images of items regarded as non-defective items and storing these images; a threshold setting unit for setting a defect threshold for detecting a defective portion of an inspection object based on the plurality of stored images; a defect amount calculating unit for calculating a defect amount to be compared with a determination threshold for making the non-defective/defective determination on the inspection object with respect to each of the plurality of stored images based on the set defective threshold; an outlier testing unit for testing, by statistical processing whether or not each of the calculated defect amounts is an outlier; and an information displaying unit for displaying and outputting outlier information for specifying an image whose defect amount has been tested to be the outlier.

Further, according to another embodiment of the invention, the visual inspection device according to the first aspect includes a selection accepting unit for accepting selection of an image to be deleted from the group of images of items regarded as non-defective items.

Further, according to still another embodiment of the invention, in the visual inspection device according to the first or second aspect, the outlier testing unit performs testing by use of at least one of a parametric technique and a non-parametric technique.

Further, according to still another embodiment of the invention, in the visual inspection device according to the first or second aspect, the outlier testing unit performs testing by use of both a parametric technique and a non-parametric technique.

Further, according to still another embodiment of the invention, in the visual inspection device according to any one of the first to fourth aspects, the defect amount calculating unit calculates the defect amount as a concentration integrated value obtained by summing up difference concentrations included in a continuous region whose concentration is larger than the defect threshold in the image.

Further, according to still another embodiment of the invention, in the visual inspection device according to any one of the first to fifth aspects, the information displaying unit displays and outputs the outlier information in descending order of the defect amount.

Next, in order to achieve the above object, according to still another embodiment of the invention, there is provided a visual inspection method executable by a visual inspection device which compares a captured image of an inspection object with a group of images of items regarded as non-defective items to make a non-defective/defective determination, the method including the steps of; accepting inputs of a plurality of images constituting a group of images of items regarded as non-defective items and storing these images; setting a defect threshold for detecting a defective portion of an inspection object based on the plurality of stored images; calculating unit for calculating a defect amount to be compared with the determination threshold for making the non-defective/defective determination on the inspection object with respect to each of the plurality of stored images based on the set defective threshold; testing, by statistical processing, whether or not each of the calculated defect amounts is an outlier; and displaying and outputting outlier information for specifying an image whose defect amount has been tested to be the outlier.

Further, according to still another embodiment of the invention, the visual inspection method according to the seventh aspect includes the step of accepting selection of an image to be deleted from the group of images of items regarded as non-defective items.

Further, according to still another embodiment of the invention, in the visual inspection method according to the seventh or eighth aspect, the testing is performed by use of at least one of a parametric technique and a non-parametric technique.

Further, according to still another embodiment of the invention, in the visual inspection method according to the seventh or ninth aspect, the testing is performed by use of both a parametric technique and a non-parametric technique.

Further, according to still another embodiment of the invention, in the visual inspection method according to any one of the seventh to tenth aspects, the defect amount is calculated as a concentration integrated value obtained by summing up difference concentrations included in a continuous region whose concentration is larger than the defect threshold in the image.

Further, according to still another embodiment of the invention, in the visual inspection method according to any one of the seventh to eleventh aspects, the outlier information is displayed and outputted in descending order of the defect amount.

Next, in order to achieve the above object, according to still another embodiment of the invention, there is provided a computer program executable by a visual inspection device which compares a captured image of an inspection object with a group of images of items regarded as non-defective items, the computer program causing the visual inspection device to function as: an image inputting unit for accepting inputs of a plurality of images constituting a group of images of items regarded as non-defective items and storing these images; a threshold setting unit for setting a defect threshold for detecting a defective portion of an inspection object based on the plurality of stored images; a defect amount calculating unit for calculating a defect amount to be compared with the determination threshold for making the non-defective/defective determination on the inspection object with respect to each of the plurality of stored images based on the set defective threshold; an outlier testing unit for testing, by statistical processing, whether or not each of the calculated defect amounts is an outlier; and an information displaying unit for displaying and outputting outlier information for specifying an image whose defect amount has been tested to be the outlier.

Further, according to still another embodiment of the invention, in the computer program according to the thirteenth aspect, the visual inspection device is caused to function as a selection accepting unit for accepting selection of an image to be deleted from the group of images of items regarded as non-defective items.

Further, according to still another embodiment of the invention, in the computer program according to the thirteenth or fourteenth aspect, the outlier testing unit is caused to function as a unit for performing testing by use of at least one of a parametric technique and a non-parametric technique.

Further, according to still another embodiment of the invention, in the computer program according to the thirteenth or fourteenth aspect, the outlier testing unit is caused to function as a unit for performing testing by use of both a parametric technique and a non-parametric technique.

Further, according to still another embodiment of the invention, in the computer program according to any one of the thirteenth to sixteenth aspects, the defect amount calculating unit is caused to function as a unit for calculating the defect amount as a concentration integrated value obtained by summing up difference concentrations included in a continuous region whose concentration is larger than the defect threshold in the image.

Further, according to still another embodiment of the invention, in the computer program according to any one of the thirteenth to seventeenth aspects, the information displaying unit is caused to function as a unit for displaying and outputting the outlier information in descending order of the defect amount.

In the first, seventh, and thirteenth aspects, inputs of a plurality of images constituting a group of images of items regarded as non-defective items are previously accepted and stored, and a defect threshold for detecting a defective portion of an inspection object is set based on the plurality of stored images. A defect amount to be compared with a determination threshold for making a non-defective/defective determination on the inspection object is calculated with respect to each of the plurality of stored images based on the set defective threshold, and whether or not each of the calculated defect amounts is an outlier is tested by statistical processing. Outlier information for specifying an image whose defect amount has been tested to be the outlier is displayed and outputted. This allows visual checking as to whether or not the defect amount calculated per image is a statistically appropriate defect amount in the group of images of items regarded as non-defective items, so as to facilitate elimination of an image of an apparently defective item from the image group to serve as the standard for setting the defect threshold. Hence it is possible to reliably eliminate an image of a defective item even in the case of mixture of the image and reduce the possibility to affect the setting of the determination threshold for making the non-defective/defective determination, so as to perform the non-defective/defective determination with high accuracy.

In the second, eighth, and fourteenth aspects, since selection of an image to be deleted from the group of images of items regarded as non-defective items is acceptable, it is possible to purposely leave even an image of a defective item left in the image group to serve as the standard for setting the determination threshold, as well as eliminate the image.

In the third, ninth, and fifteenth aspects, since the testing is performed by use of at least one of a parametric technique and a non-parametric technique, even when it is difficult to presume that the defect amount follows a fixed probability distribution such as a regular distribution, the testing can be correctly performed by the non-parametric technique. The parametric technique refers to a test method which is premised that the defect amount follows a fixed probability distribution such as a regular distribution, and the non-parametric technique refers to a test method which is premised that the defect amount does not follow the fixed probability distribution such as the regular distribution.

In the fourth, tenth, and sixteenth aspects, since the testing is performed by use of both the parametric technique and the non-parametric technique, even when it is difficult to presume that the defect amount follows a fixed probability distribution such as a regular distribution, the testing can be correctly performed by the non-parametric technique.

In the fifth, eleventh, and seventeenth aspects, since the defect amount is calculated as a concentration integrated value obtained by summing up difference concentrations included in a continuous region whose concentration is larger than the defect threshold in the image, even a portion which might not be detected as a defective portion in the case of using the difference concentration and which extends in a broad range though having a concentration lower than the defect threshold, or the like can be reliably detected as a defective portion. Herein, the difference concentration refers to a value of a difference of concentration from the defect threshold.

In the sixth, twelfth, and eighteenth aspects, the outlier information is displayed and outputted in descending order of the defect amount, and it is thereby possible to display outlier information likely to be the outlier on a higher level, so as to facilitate determination as to whether or not the image should be left in the image group to serve as the standard for setting the determination threshold.

According to the present invention, inputs of a plurality of images constituting a group of images of items regarded as non-defective items are previously accepted and stored, and a defect threshold for detecting a defective portion of an inspection object is set based on the plurality of stored images. A defect amount to be compared with a determination threshold for making a non-defective/defective determination on the inspection object is calculated with respect to each of the plurality of stored images based on the set defective threshold, and whether or not each of the calculated defect amounts is an outlier is tested by statistical processing. Outlier information for specifying an image whose defect amount has been tested to be the outlier is displayed and outputted. This allows visual checking as to whether or not the defect amount calculated per image is a statistically appropriate defect amount in the group of images of items regarded as non-defective items, so as to facilitate elimination of an image of an apparently defective item from the image group to serve as the standard for setting the defect threshold. Hence it is possible to reliably eliminate an image of a defective item even in the case of mixture of the image and reduce the possibility to affect the setting of the determination threshold for making the non-defective/defective determination, so as to perform the non-defective/defective determination with high accuracy.

DETAILED DESCRIPTION OF PREFERRED EMBODIMENTS

Hereinafter, a visual inspection device according to an embodiment of the present invention will be described with reference to the drawings. It is to be noted that elements having the same or similar configurations or functions throughout the referenced drawings are provided with the same or similar numerals, and detailed descriptions thereof are omitted.

Figure 1:
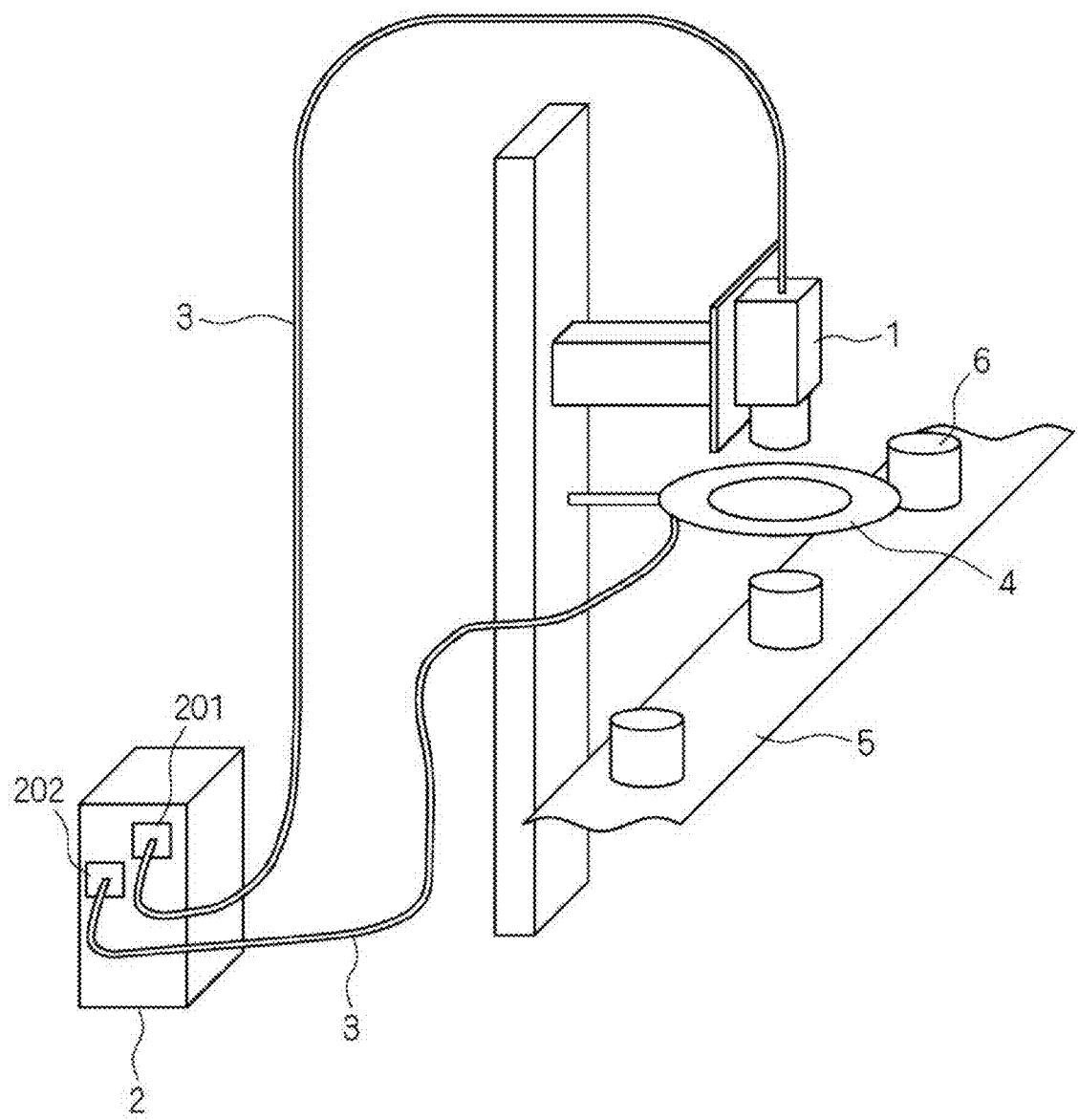
FIG. 1 is a schematic view showing a configuration of a product inspection system including a visual inspection device according to an embodiment of the present invention.

FIG. 1 is a schematic view showing a configuration of a product inspection system including a visual inspection device according to an embodiment of the present invention. As shown in FIG. 1, a product inspection system including a visual inspection device according to the present embodiment is configured by a camera 1 and a visual inspection device 2 connected with the camera 1 through a connection cable 3 in a data communicable manner. The visual inspection device 2 is connected with a display device (not shown), and houses an image processing controlling part 201 and an illumination controlling part 202.

Further, the illumination controlling part 202 is connected with an illumination device 4 through the connection cable 3 in a data communicable manner. An inspection object 6 moving on a conveyor belt 5 is irradiated with light by the illumination device 4, and an image of the inspection object 6 is captured by the camera 1. Based on the captured image of the inspection object 6, the visual inspection device 2 determines whether the inspection object 6 is a non-defective item or a defective item.

The camera 1 includes therein an FPGA, a DSP, or the like for performing image processing, and includes a camera module having an imaging element for capturing the image of the inspection object 6. A CMOS substrate is provided as the imaging element, and for example, a captured color image is converted to an HDR image by the CMOS substrate based on its conversion characteristic of expanding a dynamic range.

A plurality of inspection objects 6 flow on a line of the conveyor belt 5. The image of the inspection object 6 is captured by the camera 1 set over (or under, or lateral to) the inspection object 6, and the captured image is compared with a standard image (e.g., captured image of a non-defective item), to determine whether or not a flaw, a defect, or the like exists in the inspection object 6. When determined that a flaw, a defect, or the like exists in the inspection object 6, an NG determination is made. On the other hand, when determined that a flaw, a defect, or the like does not exist in the inspection object 6, an OK determination is made. In such a manner, the visual inspection device 2 according to the present embodiment makes a non-defective/defective determination on the inspection object 6 by use of the captured image of the inspection object 6.

Herein, in the case of performing visual inspection on the inspection object 6, it is necessary to set a variety of parameters to be used for the inspection. These parameters are, for example, an imaging parameter for defining an imaging condition, an illumination parameter for defining an illumination condition, and an image processing parameter (inspection parameter) for defining an inspection condition indicative of what kind of inspection is to be performed. In the visual inspection device 2, these variety of parameters are set before the foregoing non-defective/defective determination is made. In short, the visual inspection device 2 has an operation mode (Run mode) for making the non-defective/defective determination on the inspection object 6 and a setting mode (Non-Run mode) for setting a variety of parameters to be used for the inspection, and has a mode switching unit (not shown) for switching these modes.

The user sets (adjusts) optimum parameter values with respect to the variety of parameters on the setting mode before the non-defective/defective determination is repeatedly performed on a plurality of inspection objects 6 flowing on the line on the operation mode. Basically, default values are set with respect to the variety of parameters, and when the user determines that the default values may remain unchanged, the parameter values are not required to be adjusted.

Meanwhile, the parameter values can be adjusted in accordance with the kind of the inspection object 6 or variations in inspection environment. The visual inspection device 2 according to the present embodiment is to prevent mixture of an image of a defective item into the image group to serve as the standard for setting the determination threshold in the case of setting the optimum parameter values on the setting mode. Hereinafter, a configuration and a processing procedure of the visual inspection device 2 according to the present embodiment will be described in detail.

Figure 2:
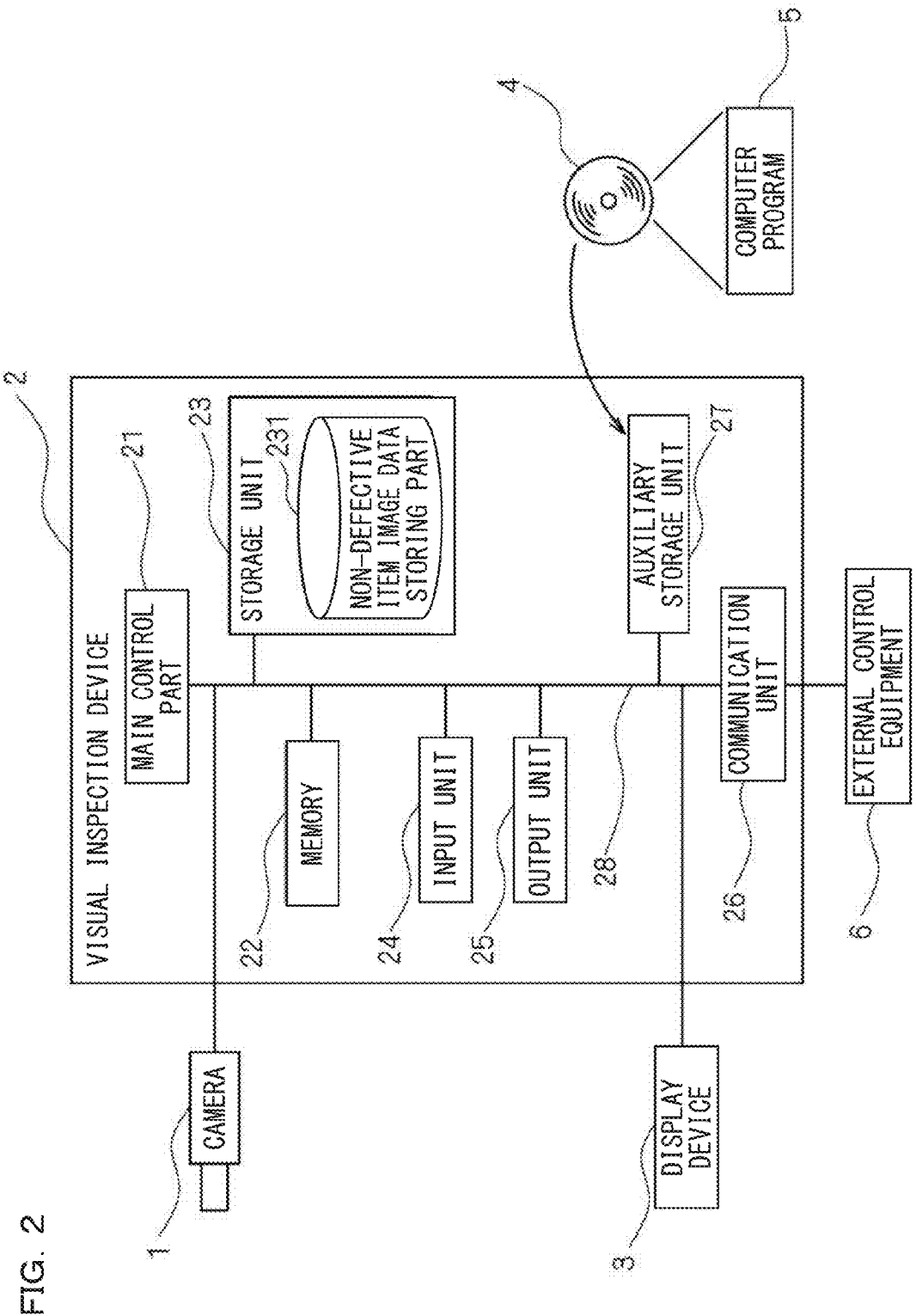
FIG. 2 is a block diagram schematically showing a configuration of the visual inspection device according to the embodiment of the present invention.

FIG. 2 is a block diagram schematically showing a configuration of the visual inspection device 2 according to the embodiment of the present invention. As shown in FIG. 2, the visual inspection device 2 according to the present embodiment is connected with the camera 1 for capturing an image and a display device 3 for displaying the captured image or an image produced in the course of arithmetic processing.

The visual inspection device 2 is at least configured by a CPU (Central Processing Unit), a main control part 21 made up of an LSI or the like, a memory 22, a storage unit 23, an input unit 24, an output unit 25, a communication unit 26, an auxiliary storage unit 27, and an internal bus 28 for connecting the foregoing hardware. The main control part 21 is connected with each part of the hardware of the visual inspection device 2 as thus described through the internal bus 28, and controls an operation of each part of the foregoing hardware, while executing a variety of software-based functions in accordance with a computer program 5 stored in the storage unit 23. The memory 22 is configured by a volatile memory such as an SRAM, an SDRAM, or the like and deployed with a load module at the time of execution of the computer program 5, and stores temporary data and the like generated at the time of execution of the computer program 5.

The storage unit 23 is configured by a built-in fixed-type storage device (hard disk, flash memory), a ROM, or the like. The computer program 5 stored in the storage unit 23 is downloaded by the auxiliary storage unit 27 from a movable recording medium 4 such as a DVD, a CD-ROM, or a flash memory, where information such as a program and data is recorded, and at the time of execution, the computer program 5 is deployed from the storage unit 23 to the memory 22, and then executed. Naturally, it may be a computer program downloaded from an external computer through the communication unit 26.

The storage unit 23 is provided with a non-defective item image data storing part 231 for storing image data of a plurality of images constituting the group of images of items regarded as non-defective items. Although the non-defective item image data storing part 231 stores image data of an image of an item regarded as a non-defective item, the data also includes image data of an image of an item erroneously determined by the user as a non-defective item despite it being a defective item. That is, image data of an image of a unit determined by the user as a non-defective item (regardless of the item being a non-defective item or not) is stored. In other words, the non-defective item image data to be stored into the non-defective item image data storing part 231 is selected and inputted by the user as one image to constitute the image group to serve as the standard for setting the determination threshold. Especially for performing below-mentioned non-defective item learning processing, the user selects an image of the inspection object 6 determined by the user as an image of a non-defective item by use of the display device 3, the input unit 24, and the like, and image data of a plurality of selected images is stored into the non-defective item image data storing part 231.

The communication unit 26 is connected to the internal bus 28, and can transmit and receive data to and from the external computer and the like by being connected to an external network such as the Internet, a LAN, or a WAN. That is, the foregoing storage unit 23 is not limited to the configuration of being housed in the visual inspection device 2, but the storage unit 23 may be an external recording medium such as a hard disk installed in an external server computer or the like which is connected through the communication unit 26.

The input unit 24 is a broad concept including, in addition to data inputting media such as a keyboard and a mouse, a device in general for acquiring input information, such as a touch panel integrated with a liquid crystal panel or the like. The output unit 25 refers to a print device such as a laser printer, a dot printer, or the like.

The display device 3 is a display device having a CRT, a liquid crystal panel, or the like. External control equipment 6 is control equipment connected through the communication unit 26, and for example, a PLC (Programmable Logic Controller) or the like corresponds to the equipment. Herein, the external control equipment 6 refers to equipment in general to perform post-processing in accordance with a result of inspection by the visual inspection device 2.

Figure 3:
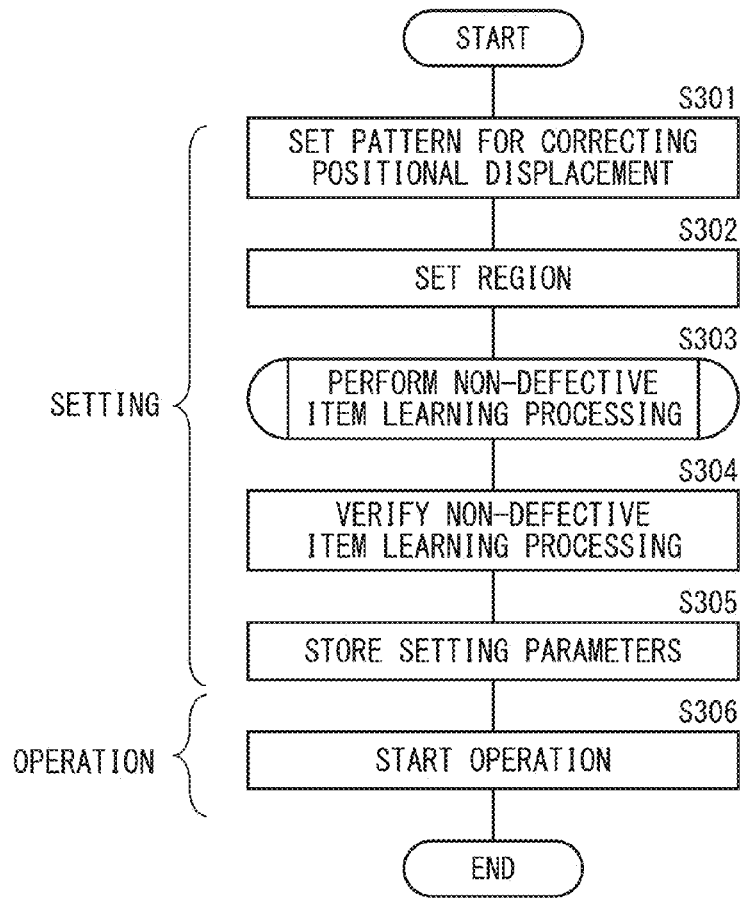
FIG. 3 is a flowchart showing a procedure of setting processing for a variety of parameters, which is performed by a main control part of the visual inspection device according to the embodiment of the present invention.

FIG. 3 is a flowchart showing a procedure of setting processing for a variety of parameters performed by the main control part 21 of the visual inspection device 2 according to the embodiment of the present invention. In FIG. 3, the main control part 21 of the visual inspection device 2 sets a positional displacement correcting pattern with respect to an image of the inspection object 6 whose input has been accepted (step S301). Specifically, the positional displacement of the image whose input has been accepted is corrected by setting a pattern of an image to serve as a standard.

The main control part 21 sets a region to be inspected (step S302). Specifically, selecting a rectangular region or a circular region allows setting of a region where the presence or absence of a defect is to be inspected.

Figure 4:
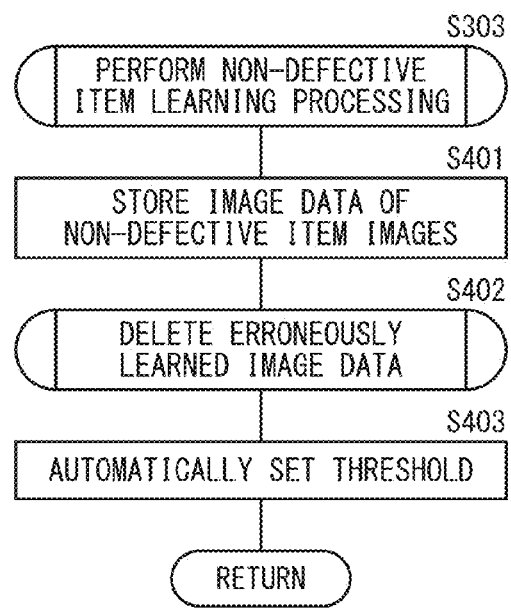
FIG. 4 is a flowchart showing a procedure of non-defective item learning processing performed by the main control part of the visual inspection device according to the embodiment of the present invention.

The main control part 21 performs non-defective item learning processing (step S303). Specifically, the non-defective item learning processing is performed as shown in FIG. 4. FIG. 4 is a flowchart showing a procedure of the non-defective item learning processing (step S303 of FIG. 3) performed by the main control part 21 of the visual inspection device 2 according to the embodiment of the present invention.

In FIG. 4, the main control part 21 of the visual inspection device 2 stores image data of a plurality of images, selected as items of non-defective items by the user through the input unit 24 or the like, into the non-defective item image data storing part 231 (step S401). The plurality of pieces of image data stored in the non-defective item image data storing part 231 becomes a group of images of items regarded as non-defective items.

Next, an image which should not essentially be stored into the non-defective item image data storing part 231, namely, an image which might cause deterioration in accuracy in detecting a defective portion (erroneous setting of a defect threshold) and has been mixed by erroneous learning, is deleted from the group of images of items regarded as non-defective items (step S402). Conventionally, the user performs visual checking, and selects and deletes an image of an item which has been determined as a defective item. However, visually checking all images stored in the non-defective item image data storing part 231 is a very complicated operation.

Thereat, in the visual inspection device 2 according to the present embodiment, an image which should not essentially be stored into the non-defective item image data storing part 231 is automatically deleted. A detail thereof will be described later with reference to FIGS. 5 and 6.

After a more appropriate image group is obtained by step S402, the determination threshold for the non-defective/defective determination may be automatically reset (step S403). A method for calculating the determination threshold is, for example, performed in accordance with the following procedure.

The main control part 21 detects a defective portion with respect to each of all the images stored in the non-defective item image data storing part 231 based on the defect threshold already set in step S402, and acquires a frequency distribution for a concentration of the detected defective portion as a histogram. Subsequently, the main control part 21 calculates a new defect threshold by statistical processing.

The main control part 21 automatically calculates an optimum defect threshold for example by use of at least one of a parametric technique (e.g. Smirnov-Grubbs test, or the like) which is premised that a concentration to serve as an object for the statistical processing follows a regular distribution, and a non-parametric technique (e.g. a test using a box-and-whisker plot, or the like) which is premised that the concentration does not follow the regular distribution. The main control part 21 performs testing as to whether or not a defect amount of each of the detected defective portions is an outlier by use of the acquired histogram. When an apparent outlier is found, a new defect threshold capable of deleting the found outlier is automatically calculated. For example, the defect threshold may be set between the found outlier and a median of portions other than the found outlier.

The main control part 21 re-detects a defective portion with respect to the foregoing image group (each of all the images stored in the non-defective item image data storing part 231) based on the calculated new defect threshold, and thereafter, calculates and sets a new determination threshold based on a defect amount of the detected defective portion. As a technique for calculating and setting the determination threshold, for example, the maximum value of the calculated defect amount or a statistically calculated value larger than the maximum value may be set as the determination threshold, or testing as to whether or not a defect amount of each of the detected defective portions is an outlier may be performed by statistical processing, and a new determination threshold may be calculated and set so that an image having the defect amount tested to be an outlier is deleted from the image group. By the automatic threshold setting, it is possible to more reliably reflect the user's intention to make an OK determination on the inspection object 6 which only has a slight flaw.

Returning to FIG. 3, the main control part 21 of the visual inspection device 2 verifies whether or not the non-defective item learning processing has been correctly performed (step S304), and adjusts setting parameters such that a non-defective item is correctly determined as a non-defective item. Specifically, the non-defective/defective determination is performed on non-defective item images acquired by capturing a number of inspection objects (non-defective items) 6 for testing by the camera 1 or the plurality of stored non-defective item images, and the user manually adjusts the setting parameters so as to obtain a correct result. After the optimal adjustment of the setting parameters, the main control part 21 stores the adjusted setting parameters (step S305), to complete the setting mode. The processing shown in steps S301 to S305 is a so-called operation on the setting mode.

Next, when a predetermined button (e.g. operation button) or the like is selected by the user through the input unit 24 or the like, the mode is shifted from the setting mode to the operation mode, and an operation of making the non-defective/defective determination on the inspection object 6 flowing on the line is started (step S306). More specifically, when a trigger signal indicating arrival of the inspection object 6 under the camera 1 is inputted from the outside, the visual inspection device 2 captures the image of the inspection object 6 and makes the non-defective/defective determination by use of the setting parameters stored in step S305.

Figure 5:
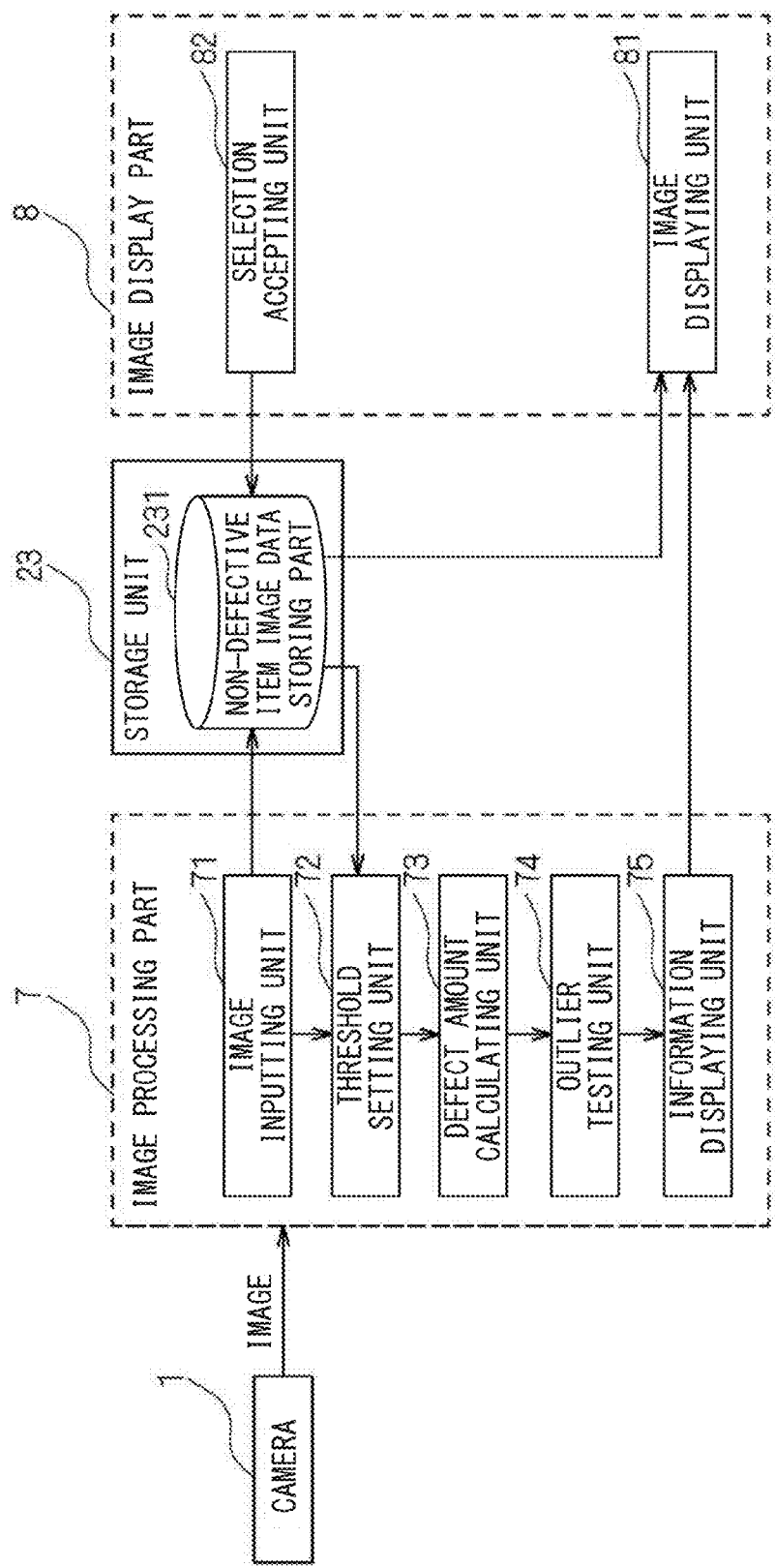
FIG. 5 is a functional block diagram showing a configuration example of the visual inspection device according to the embodiment of the present invention.

In the processing of step S402 shown in FIG. 4, the visual inspection device 2 according to the embodiment of the present invention deletes an image, erroneously stored as a non-defective item image despite it being an image of a defective item (which the user desires to treat as a defective item), based on statistical processing. FIG. 5 is a functional block diagram showing a configuration example of the visual inspection device 2 according to the embodiment of the present invention.

In FIG. 5, the visual inspection device 2 according to the present embodiment is configured by the camera 1, an image processing part 7 for performing processing of the visual inspection device 2, the storage unit 23, and an image display part 8.

The camera 1 is, for example, a digital camera and acquires an image by capturing, for example, a film surface as the inspection object 6, and outputs the image to the image processing part 7.

The image processing part 7 includes an image inputting unit 71, a threshold setting unit 72, a defect amount calculating unit 73, an outlier testing unit 74, and an information displaying unit 75. Further, the image processing part 7 is configured to include the main control part 21, the memory 22, an external I/F and the like, and controls processing operations of the image inputting unit 71, the threshold setting unit 72, the defect amount calculating unit 73, the outlier testing unit 74, and the information displaying unit 75.

The storage unit 23 functions as an image memory and stores, as necessary, image data of an image captured by the camera 1 and image data after being subjected to a variety of processing such as alignment and average value calculation in the image processing part 7. The image may not be stored as image data, but may be stored as brightness value data per pixel.

The image display part 8 is configured by the display device 3 such as a monitor for a computer. An image displaying unit 81 of the image display part 8 displays, on a display screen of the display device 3, a captured image of the inspection object 6 to serve as an object for the non-defective/defective determination and a result of determination as to whether or not the object is a non-defective item. That is, while an image in accordance with designation by the image processing part 7 is displayed on the display screen of the display device 3, a result of determination as to whether or not the inspection object 6 is a non-defective item is also displayed thereon. A selection accepting unit 82 accepts selection of an image to be deleted from the non-defective item image data storing part 231. This is performed for deleting an image of an item erroneously determined as a non-defective item despite it being a defective item and stored as a non-defective item image, from the group of images of items regarded as non-defective items.

Next, each configuration of the image processing part 7 will be described.

The image inputting unit 71 accepts inputs of a plurality of images constituting the group of images which were captured by the camera 1 and images of items regarded as non-defective items, and stores these images into the non-defective item image data storing part 231 of the storage unit 23. An image may be inputted in whatever mode of input. For example, image data of a plurality of images acquired by capturing a number of inspection objects 6 for testing by the camera 1 may be stored into the non-defective item image data storing part 231. Further, an image of one inspection object 6 for testing may be captured by the camera 1 a plurality of times while an external environment such as an illumination environment is changed, and image data of the plurality of acquired images may be stored into the non-defective item image data storing part 231. Moreover, a plurality of inspection objects 6 may be allowed to flow on the line of the conveyor belt 5 and images thereof may be captured by the camera 1, the user may select a plurality of images of items that should be determined as non-defective items out of the plurality of acquired images, and image data of the selected images may be stored into the non-defective item image data storing part 231. In short, image data of a plurality of images captured by the camera 1 or image data of a plurality of images selected by the user from the plurality of images captured by the camera 1 is stored into the non-defective item image data storing part 231.

Previously storing a plurality of pieces of image data of images of items determined as non-defective items allows storing of these image data as the image group to serve as the standard for setting the determination threshold for the non-defective/defective determination. Image data regarding each image whose input has been accepted is stored into the non-defective item image data storing part 231 of the storage unit 23.

Figure 7:
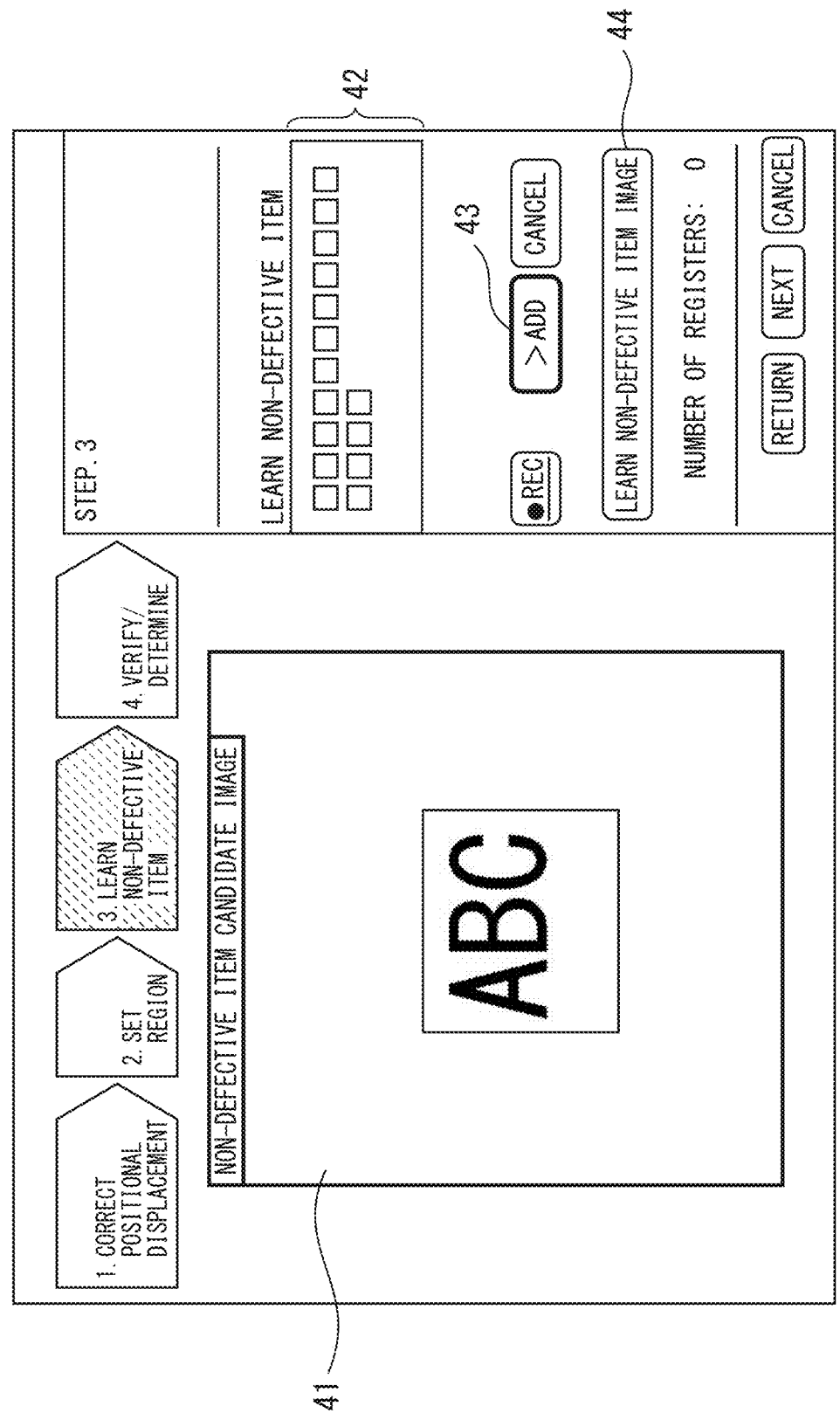
FIG. 7 is an exemplary view of a non-defective item image input accepting screen in the visual inspection device according to the embodiment of the present invention.

FIG. 7 is an exemplary view of a non-defective item image input accepting screen in the visual inspection device 2 according to the embodiment of the present invention. As shown in FIG. 7, an image of the inspection object 6 captured by the camera 1 (or one image selected by the user out of a plurality of already acquired images) is displayed in an image displaying region (main image displaying part) 41. In the non-defective item learning processing, it is displayed as a candidate of an image to be stored as a non-defective item image.

In a non-defective item learning result display region (non-defective item learning result display part) 42, one icon is displayed per image stored as a non-defective item image at this stage. In FIG. 7, it is displayed with a "☐" mark. When an "ADD" button 43 is selected, an input of an image being displayed in the image display region 41 is accepted. An image whose input has been accepted is stored into the non-defective item image data storing part 231 as a non-defective item image.

Next, when a "LEARN NON-DEFECTIVE ITEM IMAGE" button 44 is selected, the processing shown in step S402 (and the processing shown in step S403) of FIG. 4 is performed.

Figure 8:
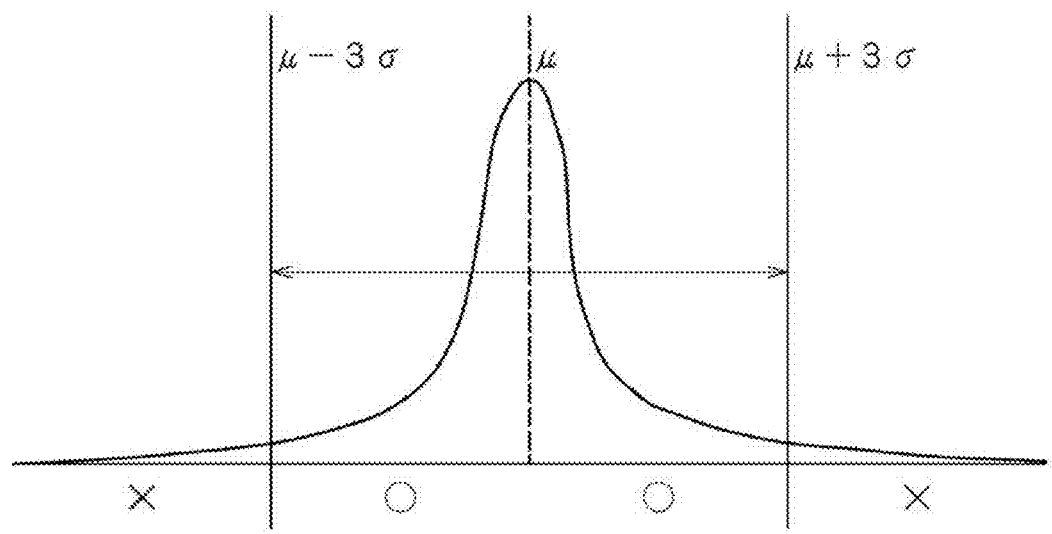
FIG. 8 is an exemplary view showing a distribution of a concentration of an arbitrary pixel in a non-defective item image stored in a non-defective item image data storing part.

Returning to FIG. 5, the threshold setting unit 72 sets a defect threshold. Specifically, based on the image data of the image whose inputs has been accepted and/or non-defective item image data stored as non-defective item images in the non-defective item image data storing part 231, an average image and a standard deviation image are calculated. It is then assumed that a concentration is regularly distributed by use of an average $\mu$ of a concentration per pixel and a standard deviation $\sigma$ of the concentration. FIG. 8 is an exemplary view showing a distribution of a concentration of arbitrary pixels in the non-defective item image stored in the non-defective item image data storing part 231. A horizontal axis indicates a concentration (generally an integer value of 0 to 255), and a vertical axis indicates a frequency. For example, when 30 non-defective item images are present, a total frequency is 30.

As shown in FIG. 8, the concentration is regularly distributed, and in the present embodiment, with the average $\mu$ of the concentration taken at the center, ($\mu-3\sigma$) and ($\mu+3\sigma$) are each regarded as an initial value of the defect threshold for detecting a defective portion. That is, as for an arbitrary pixel, when a concentration of an image of the inspection object 6 is within the range from ($\mu-3\sigma$) to ($\mu+3\sigma$), the pixel is determined not to be a defective pixel ("◯" mark in FIG. 8). On the other hand, as for an arbitrary pixel, when a concentration of an image of the inspection object 6 is not within the range from ($\mu-3\sigma$) to ($\mu+3\sigma$), the pixel is determined to be a defective pixel ("x" mark in FIG. 8). As for all pixels other than the above, it is determined whether or not each of these pixels is a defective pixel. Needless to say, the defect threshold for detecting a defective portion is changeable, and the setting can be changed (adjusted) by the threshold setting unit 72. In addition, although the defect threshold is set per pixel in the present embodiment, the present invention is not limited thereto, and for example, the defect threshold may be set per region made up of a plurality of pixels (e.g. rectangular region of 4×4 pixels). In this case, for example, whether or not to detect the rectangular region of 4×4 pixels as a defective portion is decided in accordance with whether or not a concentration value of a pixel having the maximum concentration in the region exceeds the defect threshold.

Returning to FIG. 5, the defect amount calculating unit 73 calculates a defect amount with respect to each of the non-defective item images stored in the non-defective item image data storing part 231. Specifically, a total (concentration integrated value) of difference concentrations of pixels determined as defective pixels (absolute values of values each obtained by deducting a pixel value of image data of the average image from a pixel value of a piece of image data stored in the non-defective item image data storing part 231, namely, the degree of separation from the average $\mu$ of the concentration) is calculated as a defect amount. Thereby, for example, when there are 30 pieces of non-defective item image data, 30 defect amounts are calculated.

Although a total of difference concentrations of pixels determined to be defective pixels is calculated as a defect amount in the present embodiment, a variety of other calculation methods can be considered. For example, it may be calculated as a total of concentration volumes of a blob (region made up of a plurality of defective pixels) detected in the region to be inspected, which has been set in step S302 of FIG. 3. That is, a continuous region whose concentration is larger than the defect threshold in the region to be inspected is recognized as a blob and a defect amount is calculated as a concentration integrated value obtained by summing up difference concentrations included in the blob. In the case of using the difference concentration, a portion which extends in a broad range but has a low concentration is unlikely to be detected as a defective portion. In the present embodiment, such a defective portion can be reliably detected by use of the concentration integrated value.

Further, the concentration integrated value may not be used, but a total of concentrations of pixels determined as defective pixels or a total of concentrations of a blob detected as a defective portion may simply be calculated as a defect amount. The maximum concentration value out of the concentrations of pixels determined as defective pixels may be regarded as a defect amount. In short, as long as the defect amount is a numerical value that can be compared with the determination threshold for making the non-defective/defective determination on the inspection object 6, the defect amount may be a defect concentration indicating the degree of separation from the defect threshold, or may be a defective area indicating a pixel or an area of a blob over the defect threshold, or may be a defect concentration volume obtained by multiplying the defect concentration by the defective area.

Returning to FIG. 5, the outlier testing unit 74 tests whether or not each of the calculated defect amounts is an outlier by statistical processing. For testing the outlier, at least one of a parametric technique which is premised that a defect amount to serve as an object of statistical processing follows a fixed probability distribution such as a regular distribution and the non-parametric technique which is premised that the defect amount does not follow the regular distribution. In the present embodiment, both techniques are used. That is, a defect amount which is tested to be an outlier in the parametric technique and also tested to be an outlier in the non-parametric technique is regarded as an outlier. This can prevent a value which is not an outlier from being erroneously tested to be an outlier whether or not the defect amount follows the regular distribution. Details of the parametric technique and the non-parametric technique will be described later.

Next, the information displaying unit 75 displays and outputs outlier information for specifying an image whose defect amount has been tested to be the outlier. This allows the user to easily determine whether or not to leave an image specified by the displayed outlier information, namely, an image of the inspection object 6 which is likely to be a defective item, in the image group to serve as the standard for the determination threshold (whether or not to leave the image in the non-defective item image data storing part 231). Although the outlier information is displayed in the display device 3 in the present embodiment, alternatively, the outlier information may be displayed in external equipment such as a PLC.

Figure 6:
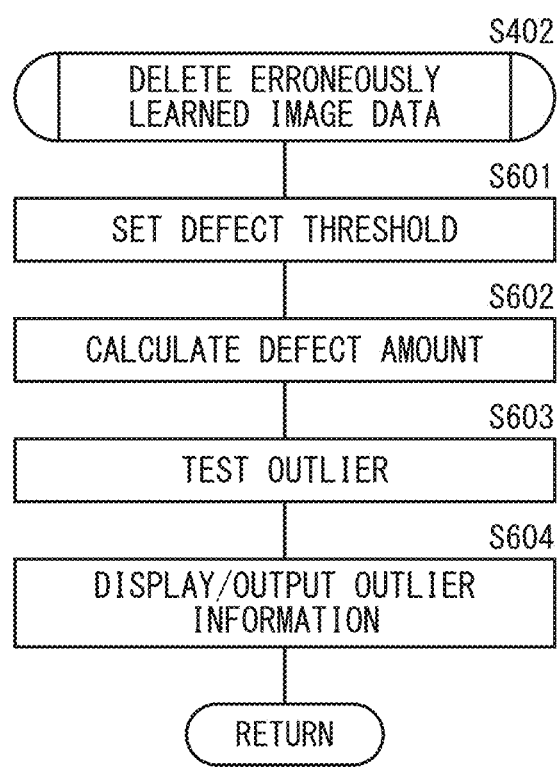
FIG. 6 is a flowchart showing a procedure of deletion processing for erroneously learned image data, which is performed by the main control part of the visual inspection device according to the embodiment of the present invention.

FIG. 6 is a flowchart showing a procedure of deletion processing for erroneously learned image data (step S402 of FIG. 4), which is performed by the main control part 21 of the visual inspection device 2 according to the embodiment of the present invention. In FIG. 6, the main control part 21 of the visual inspection device 2 sets a defect threshold for detecting a defective portion (step S601).

The main control part 21 calculates a defect amount based on the set defect threshold (step S602). Specifically, a total (concentration integrated value) of difference concentrations of pixels determined as defective pixels (absolute values of values each obtained by deducting a pixel value of image data of the average image from a pixel value of a piece of image data stored in the non-defective item image data storing part 231, namely, the degree of separation from the average $\mu$ of the concentration) is calculated as a defect amount.

The main control part 21 tests whether or not each of the calculated defect amounts is an outlier by statistical processing (step S603). In the present embodiment, both the parametric technique and the non-parametric technique are used, and the defect amount which is tested to be an outlier in the parametric technique and is also tested to be an outlier in the non-parametric technique is regarded as an outlier.

The main control part 21 displays and outputs outlier information for specifying an image whose defect amount has been tested to be the outlier (step S604).

Figure 9:
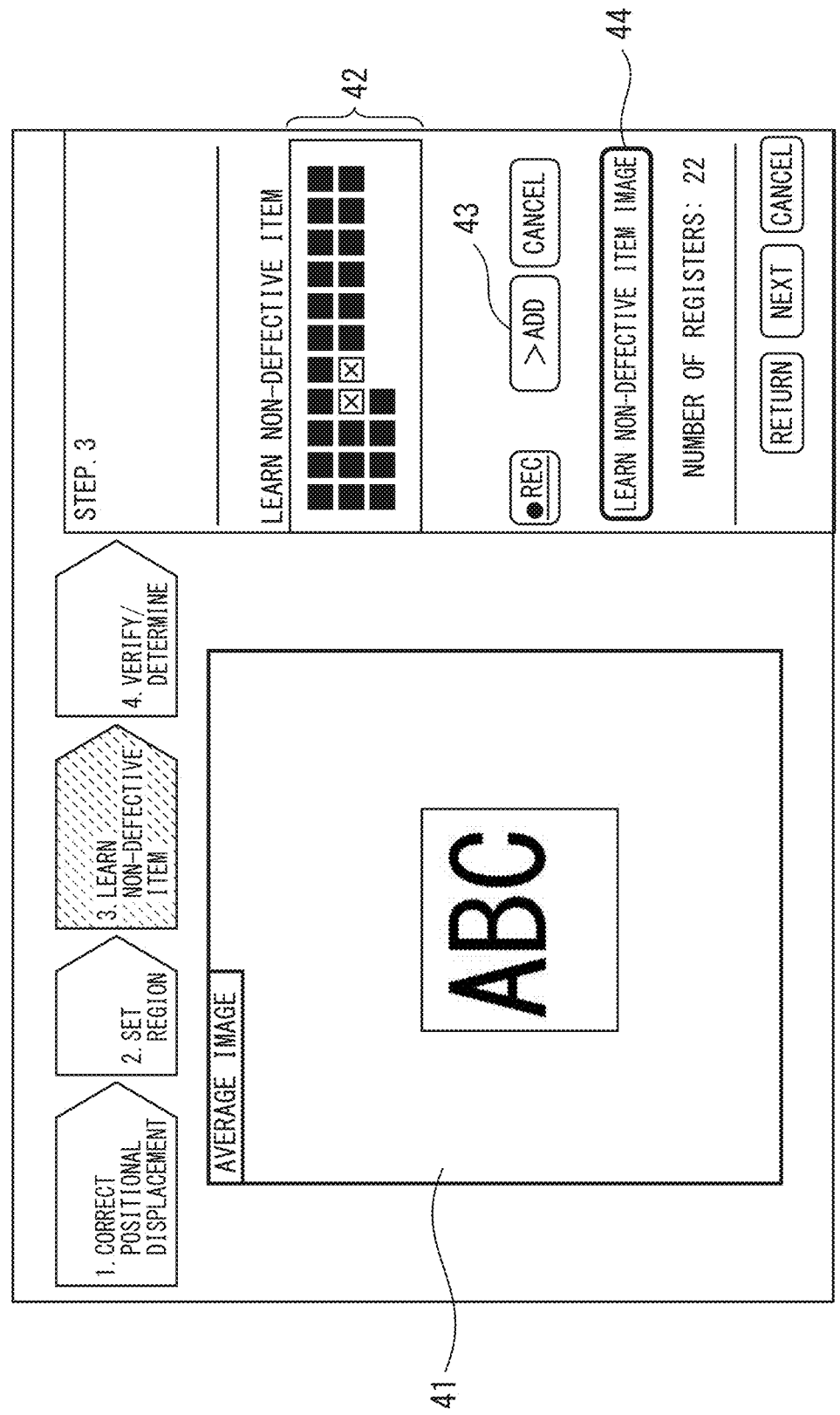
FIG. 9 is an exemplary view of a non-defective item image input accepting screen after the non-defective item learning processing in the visual inspection device according to the embodiment of the present invention.

FIG. 9 is an exemplary view of a non-defective item image input accepting screen after the non-defective item learning processing in the visual inspection device 2 according to the embodiment of the present invention. As shown in FIG. 9, in the present embodiment, a calculated average image is displayed in the image display region 41. Further, in the non-defective item learning result display region 42, an icon of a "□" mark which corresponds to an image whose defect amount has been tested not to be an outlier changes in display color, whereas an icon which corresponds to an image whose defect amount has been tested to be an outlier is displayed with an "x" mark. As described above, the image whose defect amount has been tested to be an outlier is clearly displayed, thereby allowing the user to specify and delete an image which may cause deterioration in accuracy in detecting a defective portion. Although an image is automatically deleted in accordance with the procedure described in FIG. 10 below in the present embodiment, the image whose defect amount has been tested to be an outlier may be deleted manually from the non-defective item image data storing part 231.

Figure 10:
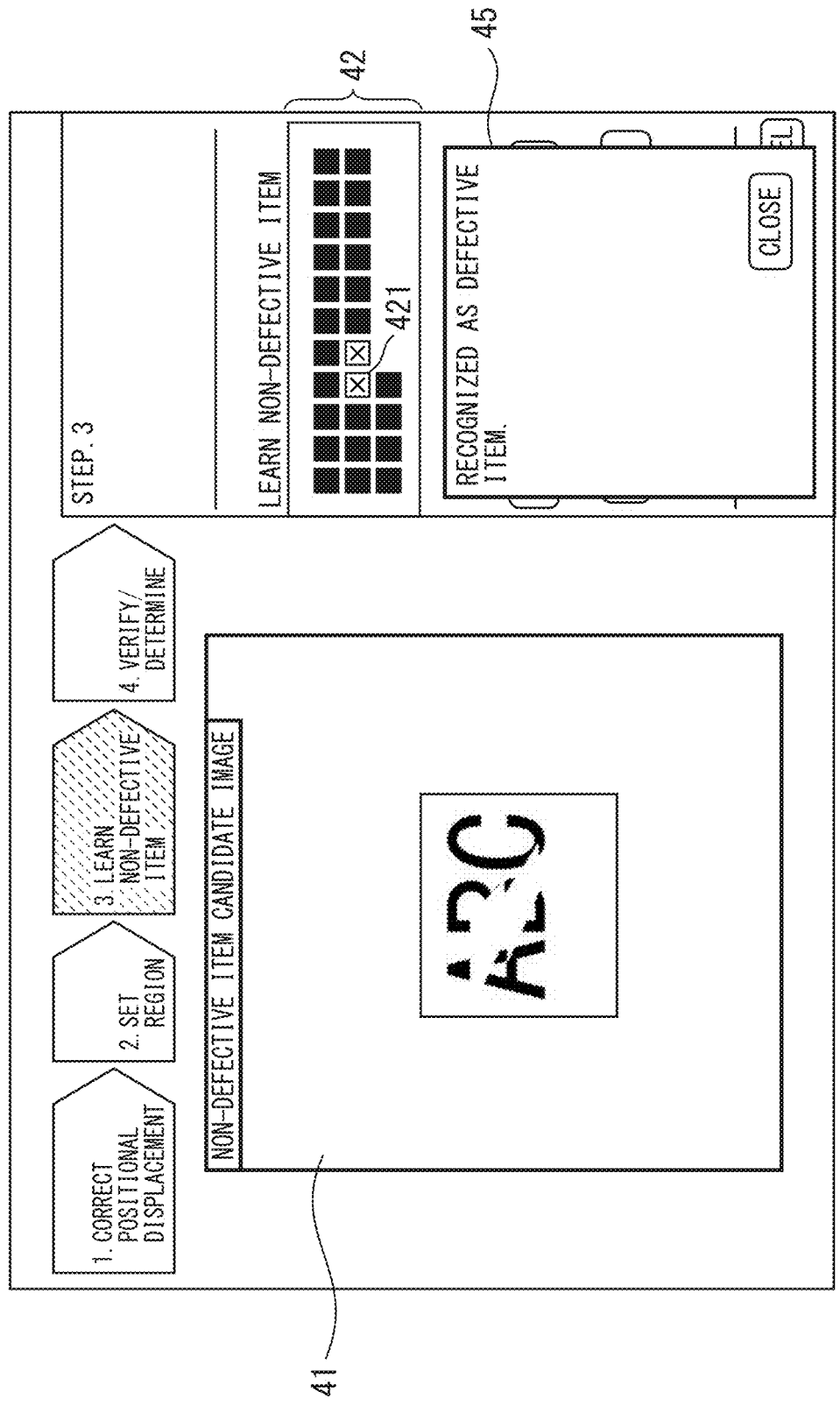
FIG. 10 is an exemplary view of a non-defective item image input accepting screen in the case of selecting an icon for a defective item in the visual inspection device according to the embodiment of the present invention.

FIG. 10 is an exemplary view of a non-defective item image input accepting screen in the case of selecting an icon for a defective item in the visual inspection device 2 according to the embodiment of the present invention. As shown in FIG. 10, when an "x"-marked icon 421 in the non-defective item learning result display region 42 is selected, an image corresponding to the icon 421 is displayed in the image display region 41. Simultaneously, a reason displaying region (reason displaying part) 45 is displayed as a pop-up screen, and a message indicating that it has been "RECOGNIZED AS DEFECTIVE ITEM" is displayed as a reason for the display of the "x" mark.

Further, image data of the image corresponding to the "x"-marked icon 421 is automatically deleted from the non-defective item image data storing part 231. This allows deletion of image data of an image of a defective item as shown in FIG. 10, the image data having been mixed into the non-defective item image data storing part 231, from the image group for setting the determination threshold. Although automatic deletion is performed in such a manner in the present embodiment, for example, a pop-up screen or the like may be displayed, and the user may be allowed to select whether or not to delete image data from the non-defective item image data storing part 231.

Figure 11:
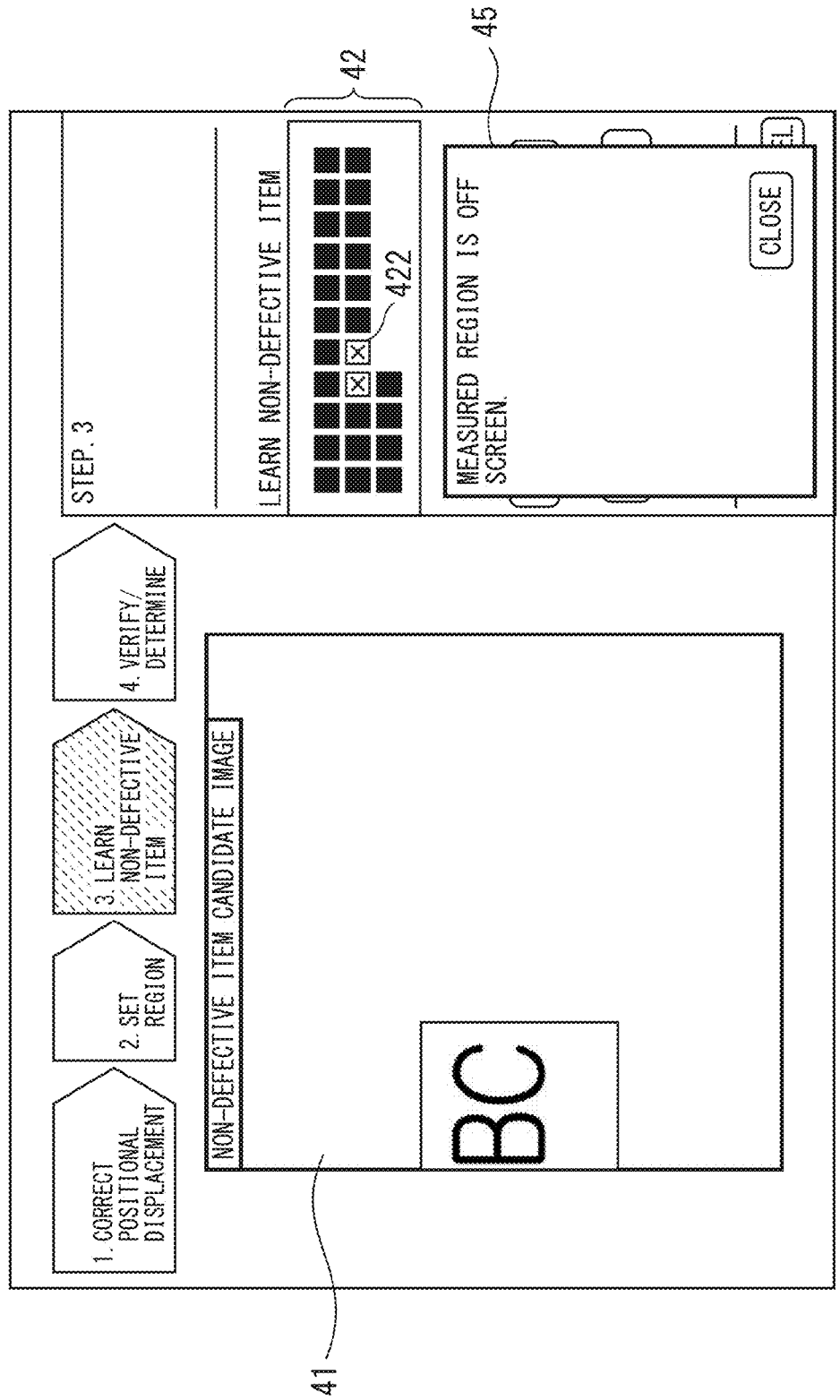
FIG. 11 is an exemplary view of a non-defective item image input accepting screen in the case of selecting an icon for another defective item in the visual inspection device according to the embodiment of the present invention.

Further, FIG. 11 is an exemplary view of a non-defective item image input accepting screen in the case of selecting an icon for another defective item in the visual inspection device 2 according to the embodiment of the present invention. As shown in FIG. 11, when an "x"-marked icon 422 in the non-defective item learning result display region 42 is selected, an image corresponding to the icon 422 is displayed in the image display region 41. In FIG. 11, the image lies off the image display region 41. Simultaneously, the reason displaying region 45 is displayed as a pop-up screen, and a message indicating that "MEASURED REGION IS OFF SCREEN" is displayed as a reason for the display of the "x" mark.

Further, similarly to FIG. 10, image data of an image corresponding to the "x"-marked icon 422 is automatically deleted from the non-defective item image data storing part 231. This allows deletion of image data of an image of a defective item as shown in FIG. 11, the image data having been mixed into the non-defective item image data storing part 231, from the image group for setting the determination threshold. Although automatic deletion is performed in such a manner in the present embodiment, for example, a pop-up screen or the like may be displayed, and the user may be allowed to select whether or not to delete image data from the non-defective item image data storing part 231.

As described above, in the visual inspection device 2 according to the present embodiment, it is possible to visually check whether or not the defect amount calculated per image is a statistically appropriate defect amount in the group of images of items regarded as non-defective items, so as to facilitate elimination of an image of an apparently defective item from the image group to serve as the standard for setting the defect threshold. As a result, possibility to affect the setting of the determination threshold for the non-defective/defective determination can be reduced, and deterioration in determination accuracy can be further prevented.

Figure 12:
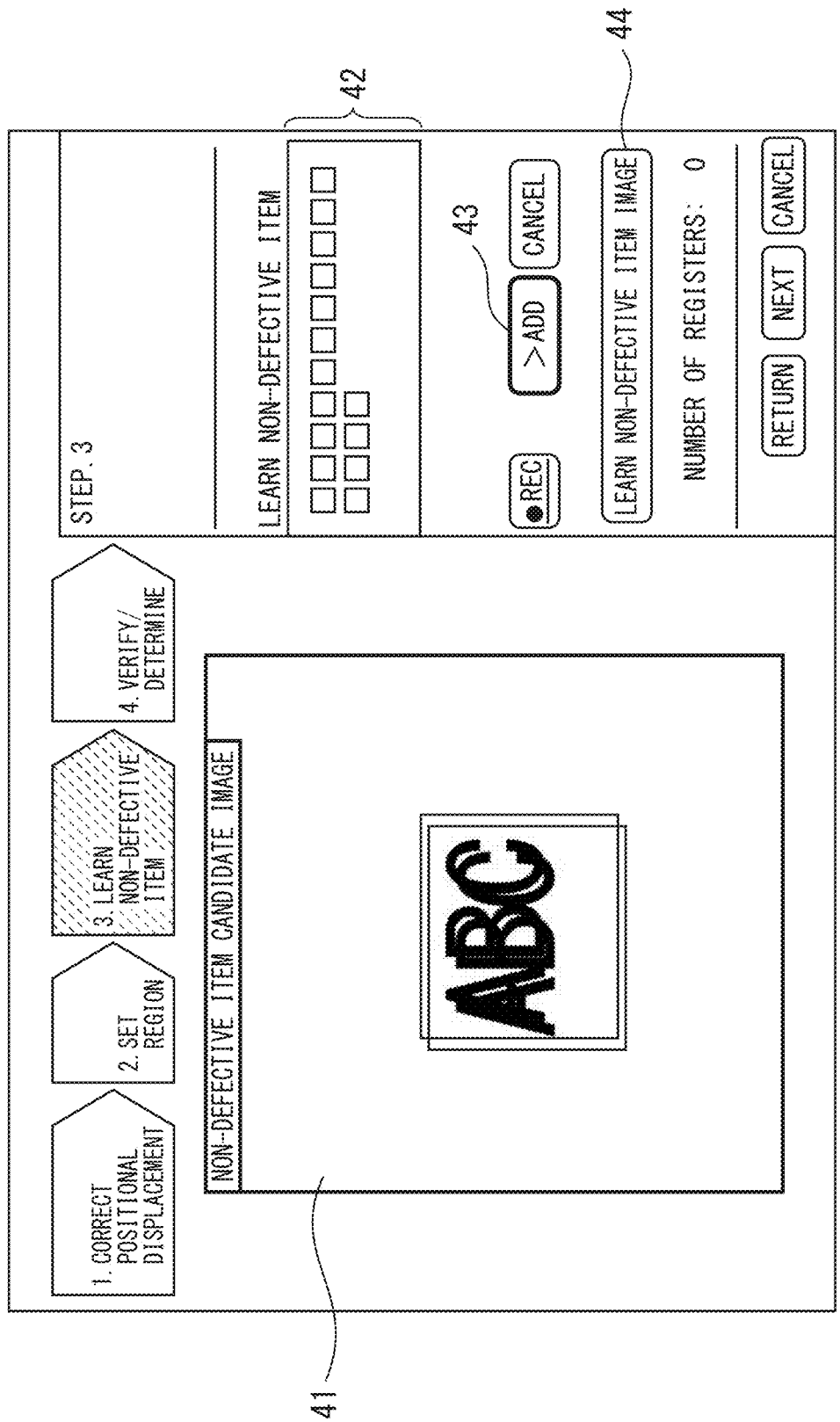
FIG. 12 is an exemplary view of a non-defective item image input accepting screen in the case of superimposing an image to serve as a standard for positional adjustment on an image whose input has been accepted in the visual inspection device according to the embodiment of the present invention.

When inputs of a plurality of images constituting the group of images of items regarded as non-defective items are accepted in the image inputting unit 71, an image to serve as a standard for positional adjustment may be superimposed and displayed on the image whose input has been accepted. FIG. 12 is an exemplary view of a non-defective item image input accepting screen in the case of superimposing and displaying an image to serve as a standard for positional adjustment on an image whose input has been accepted in the visual inspection device 2 according to the embodiment of the present invention.

As shown in FIG. 12, in the image display region 41, an image to serve as a standard for positional adjustment is displayed, and an image whose input has been accepted is superimposed and displayed with the image to serve as the standard for the positional adjustment. It is thereby possible to visually check the degree of positional displacement of the image whose input has been accepted with respect to the image to serve as the standard for the positional adjustment, so as to more reliably perform correction of positional displacement. Although the image to serve as the standard for the positional adjustment is displayed in the image display region 41 in the present embodiment, for example, an average image of the group of non-defective item images may be displayed.

Figure 13:
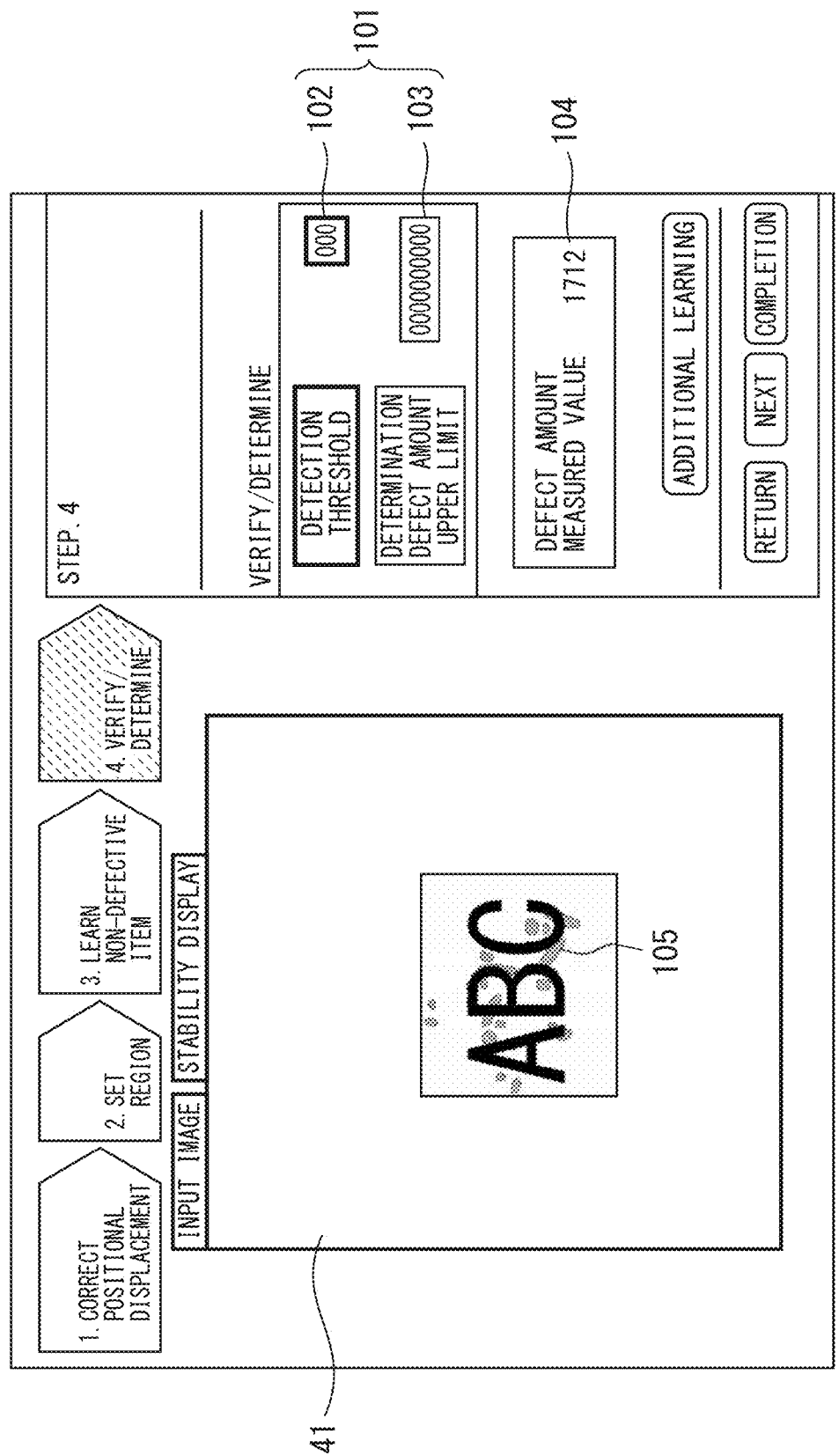
FIG. 13 is an exemplary view of a verification screen in the visual inspection device according to the embodiment of the present invention.

The user verifies whether or not the non-defective item learning processing has been correctly performed. Further, the setting parameters can be manually adjusted as necessary. FIG. 13 is an exemplary view of a verification screen in the visual inspection device 2 according to the embodiment of the present invention.

As shown in FIG. 13, a threshold setting region 101 is provided with a defect threshold setting region 102 for setting a defect threshold for detecting a defective portion, and an upper limit setting region 103 for setting an upper limit of a defect amount as a determination threshold. A "DETECTION THRESHOLD" shown in FIG. 13 refers to a value showing a fixed shift amount to be added to a portion of $3\sigma$ in the defect threshold $\mu \pm 3\sigma$. For example, when the "DETECTION THRESHOLD" is set to '10', the defect threshold is set to $\mu \pm (3\sigma+10)$. Further, a "DETERMINATION DEFECT AMOUNT UPPER LIMIT" shown in FIG. 13 is a determination threshold for making the non-defective/defective determination on the inspection object 6. For example, in the case of setting the "DETERMINATION DEFECT AMOUNT UPPER LIMIT" to '100', an OK determination is made when a defect amount calculated by the defect amount calculating unit 73 is not larger than '100', and an NG determination is made when the defect amount calculated by the defect amount calculating unit 73 exceeds '100'. In the example of FIG. 13, the "DETERMINATION DEFECT AMOUNT UPPER LIMIT" is set to '0', and an NG determination is made when the defect amount calculated by the defect amount calculating unit 73 is not smaller than '1'. That is, although a defective portion 105 is displayed in the image display region 41 of FIG. 13, an NG determination is made regardless of a quantity of this defective portion 105. Further, in a defect amount displaying region (defect amount displaying part) 104, the defect amount calculated by the defect amount calculating unit 73 is displayed.

Figure 14:
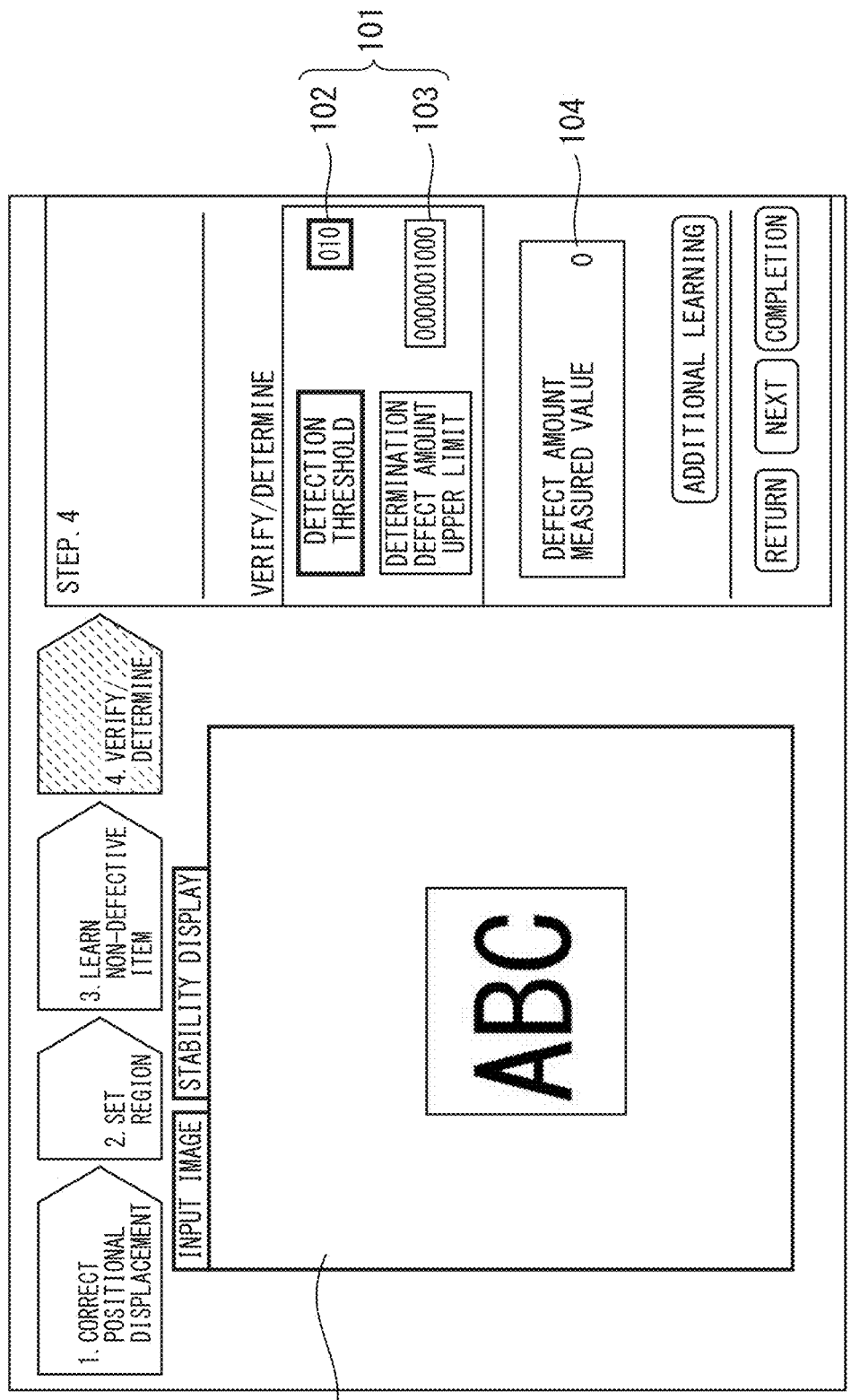
FIG. 14 is an exemplary view of a verification screen in the visual inspection device according to the embodiment of the present invention.

FIG. 14 is an exemplary view of a verification screen in the visual inspection device 2 according to the embodiment of the present invention. As shown in FIG. 14, when the defect threshold and the determination threshold are set in the defect threshold setting region 102 and the upper limit setting region 103, only a non-defective item image is displayed in the image display region 41 while the defective portion 105 is not displayed, and hence an OK determination is made.

Figure 15:
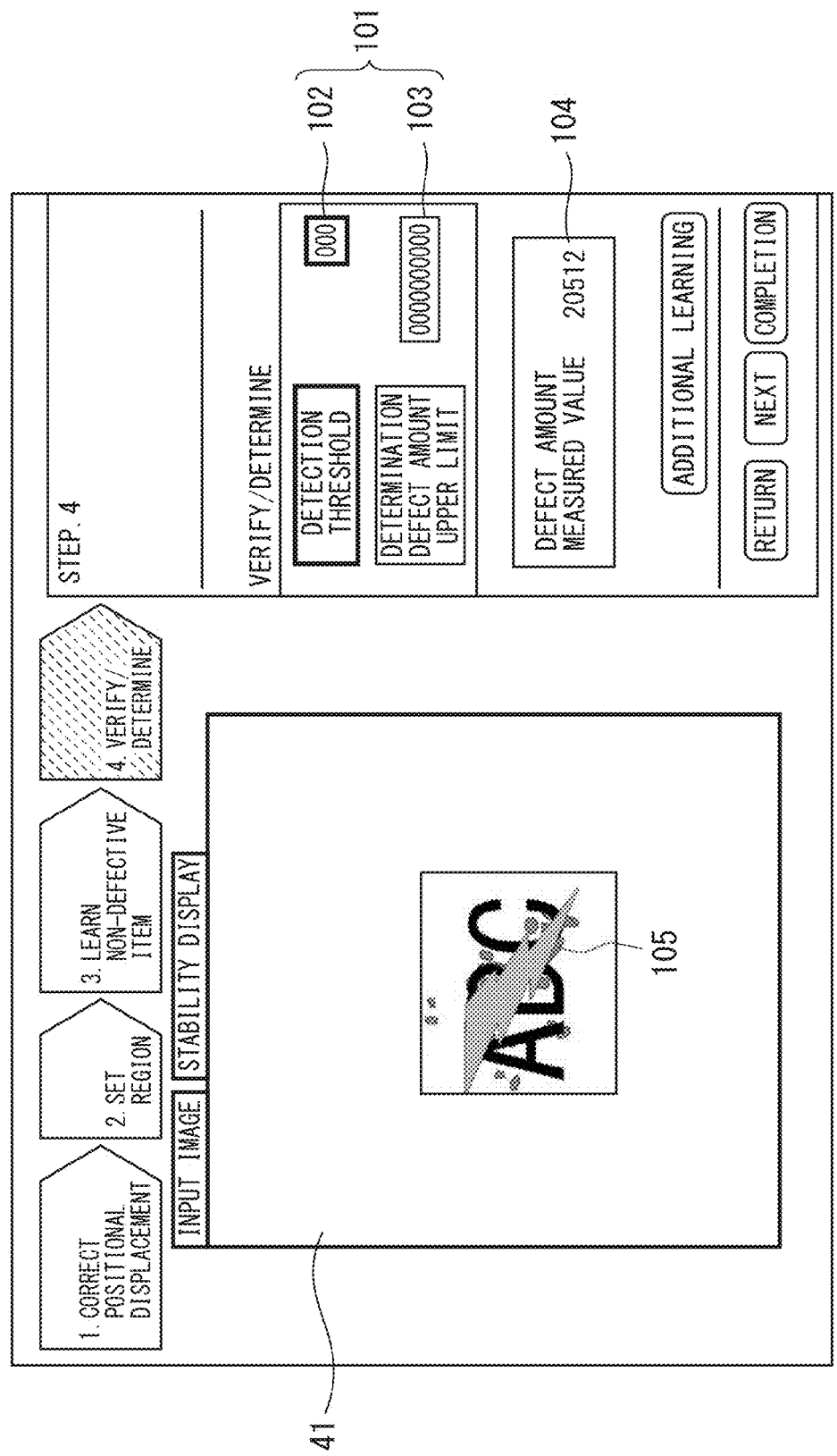
FIG. 15 is an exemplary view of a verification screen in the visual inspection device according to the embodiment of the present invention.

Further, in the case of a defective-item image, the upper limit of the defect amount is set as the determination threshold, and hence it is possible to clearly show where the defective portion is. FIG. 15 is an exemplary view of a verification screen in the visual inspection device 2 according to the embodiment of the present invention.

As shown in FIG. 15, when the defect threshold and the determination threshold are not set in the defect threshold setting region 102 and the upper limit setting region 103, the defective portion 105 is displayed with respect to the defective-item image in the image display region 41. Further, in the defect amount displaying region 104, the calculated defect amount is displayed. Accordingly, display/non-display of the defective portion 105 can be switched by changing the setting of the defect threshold (detection threshold).

Figure 16:
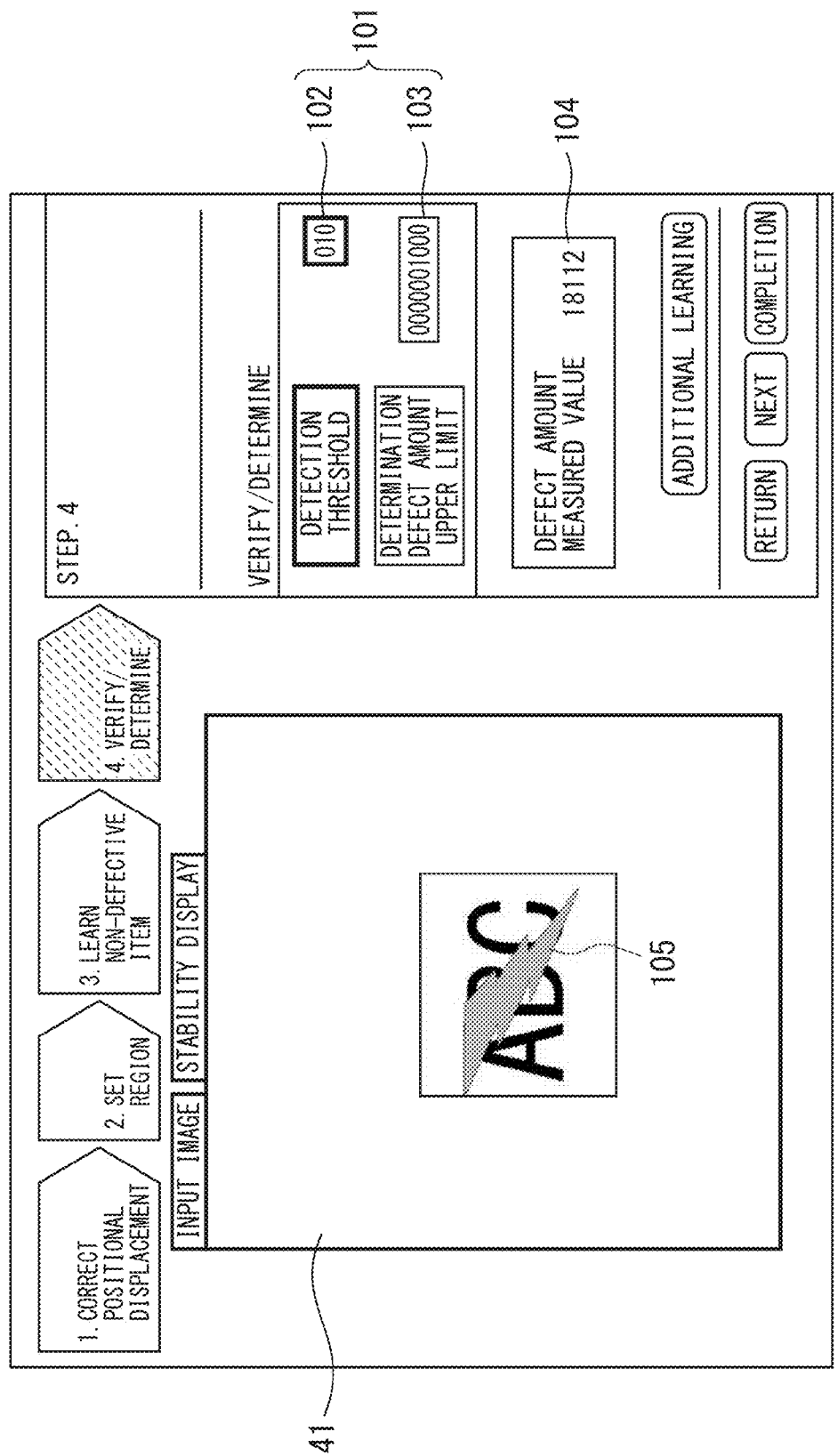
FIG. 16 is an exemplary view of a verification screen in the visual inspection device according to the embodiment of the present invention.

FIG. 16 is an exemplary view of a verification screen in the visual inspection device 2 according to the embodiment of the present invention. As shown in FIG. 16, when the defect threshold and the determination threshold are set in the defect threshold setting region 102 and the upper limit setting region 103, the defective portion 105 is displayed with respect to a defective-item image in the image display region 41, and hence an NG determination is made. However, a defective portion having a concentration not larger than the set defect threshold is not displayed. Hence it is possible to visually check where a defective portion is, while deleting a noise component which is not larger than the defect threshold and not the defective portion.

Further, in the present embodiment, in the outlier testing processing of step S603 of FIG. 6, both the parametric technique and the non-parametric technique are used. An example of these techniques will be described in detail below. A Smirnov-Grubbs test is adopted as the parametric technique which is premised that a defect amount to serve as an object for the statistical processing follows a regular distribution, and a test using a box-and-whisker plot is adopted as the non-parametric technique which is premised that the defect amount does not follow the regular distribution. Naturally, the present invention is not limited to the use of the regular distribution, but a probability distribution such as a t-distribution, an $\chi^2$-distribution, a Poisson distribution, or a binomial distribution may be used.

In the Smirnov-Grubbs technique, an average value of defect amounts X is taken as an X-bar, the maximum value thereof as Xi, and a standard deviation thereof as σ, a standard value Ti calculated by (Equation 1) is compared with a significant point t obtained from a statistics table, to test whether or not it is an outlier.

[Mathematical Formula 1]

$$T_i = \frac{X_i - \overline{X}}{\sigma} \quad \text{(Equation 1)}$$

For example, a significant level of 1% refers to a probability of 1% that a value will be regarded as an outlier even though it is not an outlier. When the standard value Ti is smaller than the significant point t corresponding to the significant level of 1%, data of the maximum (minimum) of the defect amount X is tested not to be an outlier, and when the standard value Ti is larger than the significant point t corresponding to the significant level of 1%, the data of the maximum (minimum) of the defect amount X is tested to be an outlier.

In the present embodiment, one-side testing may be enough since what is required is to have an image with a large defect amount not included in non-defective item images. Naturally, both-side testing may be performed.

The calculated defect threshold may be automatically set based on the Smirnov-Grubbs technique. In this case, the significant point t corresponding to a significant level of α % is obtained from the statistics table, and a defect threshold Xi is calculated by use of a third formula of (Equation 2) (inverse operation to (Equation 1)).

[Mathematical Formula 2]

$$\begin{cases} T_i \geq t \\ T_i = \frac{X_i - \overline{X}}{\sigma} \end{cases} \quad \text{(Equation 2)}$$

$$\overline{X} + \sigma t \leq X_i$$

The defect threshold Xi calculated by (Equation 2) is automatically set in the defect threshold setting region 102, and by executing visual inspection again on an image whose input has been newly accepted, it is possible to check whether or not the automatically set defect threshold is appropriate.

Further, in the test using a box-and-whisker plot, a frequency distribution for the defect amount X is calculated to produce a histogram. When the number of defective portions is N (N is a natural number), a defect amount corresponding to the N/4-th from the smallest is obtained as a first quartile point (25% point), and a defect amount corresponding to the 3N/4-th is obtained as a third quartile point (75% point). Then, an IQR (Interquartile Range) is calculated as a difference between the third quartile point (75% point) and the first quartile point (25% point).

The box-and-whisker plot refers to a plot displaying a range from the first quartile point (25% point) to the third quartile point (75% point) with a median of the defect amount X placed therebetween in the shape of a "box", and displaying ranges from the first quartile point (25% point) and the third quartile point (75% point) to thresholds for testing outliers respectively in the shape of a "whisker".

Figure 17:
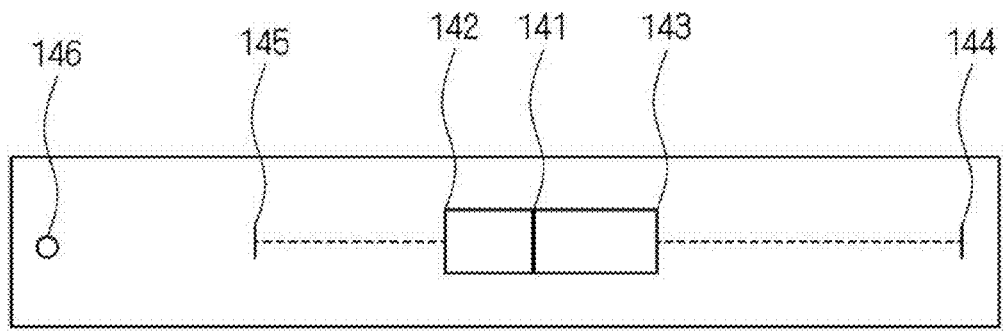
FIG. 17 is an explanatory view in the case of testing whether or not a value is an outlier by use of a box-and-whisker plot in the visual inspection device according to the embodiment of the present invention.

FIG. 17 is an explanatory view in the case of testing whether or not a value is an outlier by use of a box-and-whisker plot in the visual inspection device 2 according to the embodiment of the present invention.

As shown in FIG. 17, a range from a first quartile point (25% point) 142 to a third quartile point (75% point) 143 with a median 141 of the defect amount X placed therebetween is illustrated in the shape of a "box". For example, with an upper limit threshold 144 for testing whether or not a value is an outlier taken as (third quartile point+3×IQR) and a lower limit threshold 145 taken as (first quartile point−3×IQR), a range from the third quartile point 143 to the upper limit threshold 144 and a range from the lower limit threshold 145 to the first quartile point 142 are displayed each by a dotted line in the shape of a "whisker". Naturally, a coefficient, by which the IQR is multiplied, is not limited to '3', but it may be '1.5' for performing stricter testing, or may be changed in accordance with a standard for testing.

When the defect amount X is between the thresholds 144 and 145, it is not an outlier, and when it is off the range between the thresholds 144 and 145 such as a defect amount 146, it can be tested to be an outlier. In the present embodiment, just one side testing may be performed which determines only an image having a large defect amount to be a defective-unit image, and hence only an image whose defect amount exceeds (third quartile point+3×IQR) of the upper limit threshold 144 is taken as an outlier.

Further, in the present embodiment, the icon of the "□" mark which corresponds to an image whose defect amount has been tested to be an outlier is changed in display color in "DISPLAY AND OUTPUT OUTLIER INFORMATION" in step S604 of FIG. 6, but the outlier information is desirably displayed and outputted for example in descending order of the defect amount. For example, "x"-marked icons are sequentially selected by displaying "x"-marked icons in descending order of the defect amount (e.g. from left) in the non-defective item learning result display region 42, and hence, sequentially selecting the "x"-marked icons allows display of images sequentially from an image with the largest defect amount in the image display region 41. Further, the user shifts a cursor sequentially from left to right, to thereby allow display of images sequentially from an image with the largest defect amount in the image display region 41.

As described above, for example, the erroneously learned image data deleting processing shown in FIG. 6 is performed each time a new non-defective item image is added by the user, and it is thus possible to delete from the non-defective item image data storing part 231 an image of an item determined as a non-defective item despite it being a defective item. Further, in step S403 of FIG. 4, the non-defective/defective determination is made again based on the reset determination threshold, and hence a non-defective/defective determination can be made with high accuracy.

Figure 18:
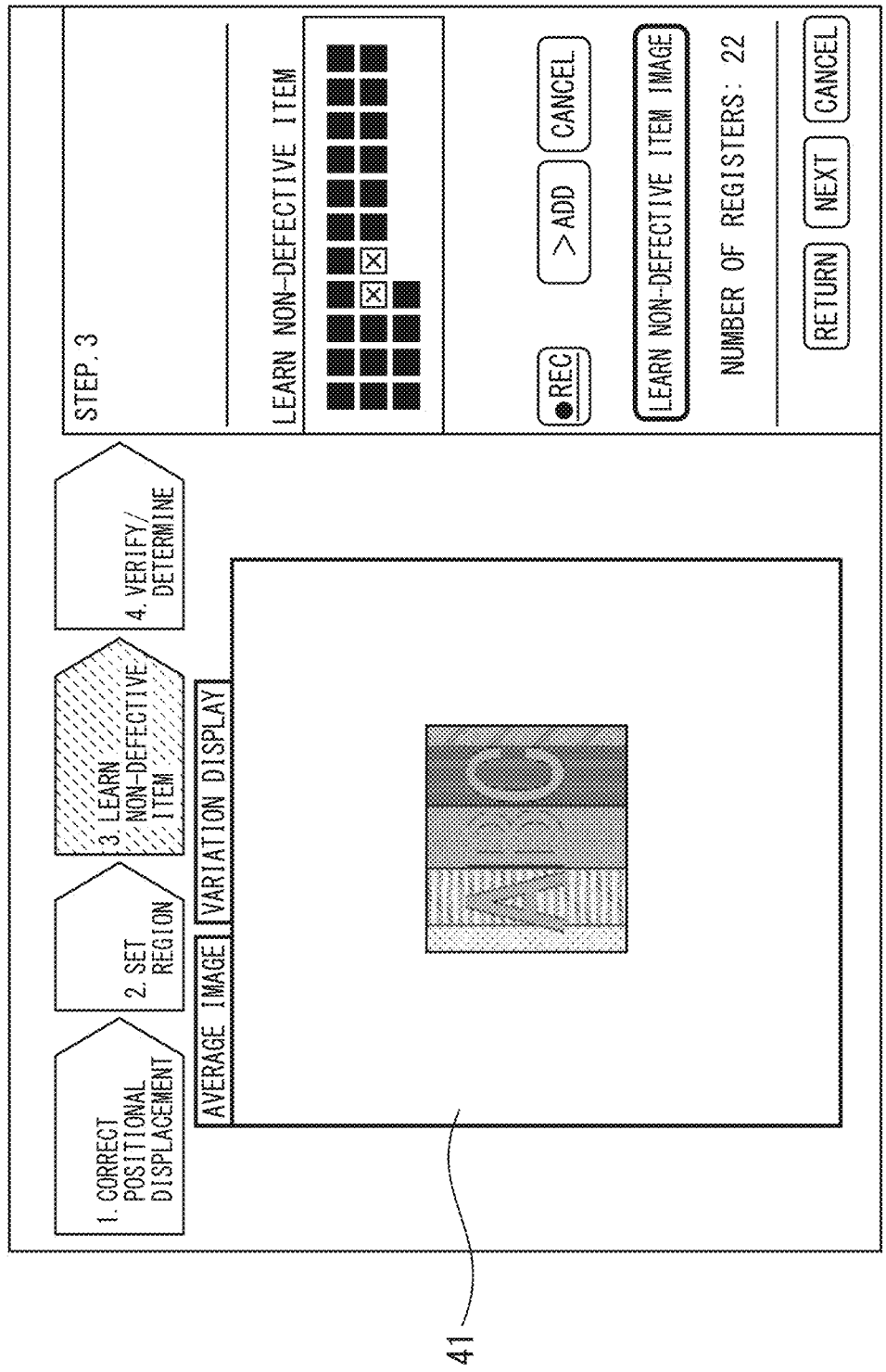
FIG. 18 is an exemplary view of a non-defective item image input accepting screen after the non-defective item learning processing in the visual inspection device according to the embodiment of the present invention.

It is to be noted that the magnitude of the standard deviation σ constituting the defect threshold may be displayed as a variation degree. FIG. 18 is an exemplary view of a non-defective item image input accepting screen after the non-defective item learning processing in the visual inspection device 2 according to the embodiment of the present invention. In FIG. 18, a standard deviation image is displayed in the image display region 41. In the standard deviation image, a change in gradation is preferably expressed by a change in hue. This is because, for example, a defect in a boundary portion or the like where determination accuracy deteriorates due to the change in hue can be visually checked. Although the hue is changed here, for example, hue and chroma may be simultaneously changed.

Further, a display of only the defect portion has also been made. However, in the case of displaying only the defective portion, there has been a problem that which portion of the inspection object 6 the defect has occurred is unclear. Therefore, for example, in the case of occurrence of a defect, a defective portion is colored and the other portion is grayed, which are then displayed.

Figure 19:
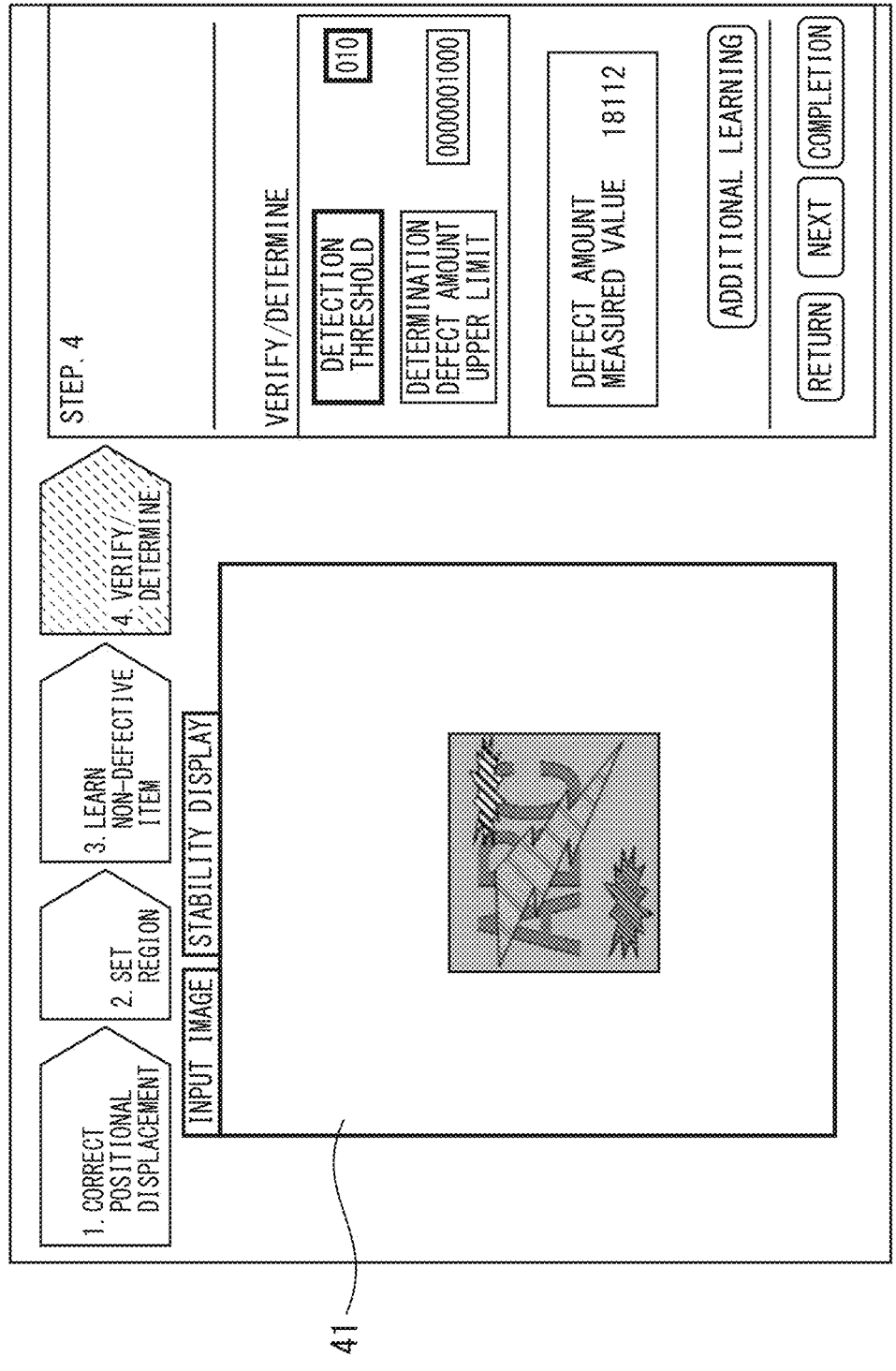
FIG. 19 is an exemplary view of a display screen for a result of the non-defective item learning processing in the visual inspection device according to the embodiment of the present invention.

FIG. 19 is an exemplary view of a display screen for a result of the non-defective item learning processing in the visual inspection device 2 according to the embodiment of the present invention. As shown in FIG. 19, a defective-item image with a defective portion detected is displayed in the image display region 41. In this case, a color of the defective portion is changed and displayed, for example, in red while the other portion is displayed in gray, so that the user can easily visually check in which portion of the inspection object 6 the defect has occurred.

Further, the shape of a predetermined region of the average image may be previously stored, and at the time of accepting an input of a non-defective item image, the shape of the predetermined region of the average image may be detected from the image whose input has been accepted. When the shape of the predetermined region cannot be detected, a region to be inspected in the inspection object 6 might be erroneously set, and the determination accuracy significantly deteriorates. Accordingly, detecting the shape of the predetermined region can prevent deterioration in determination accuracy.

Figure 20:
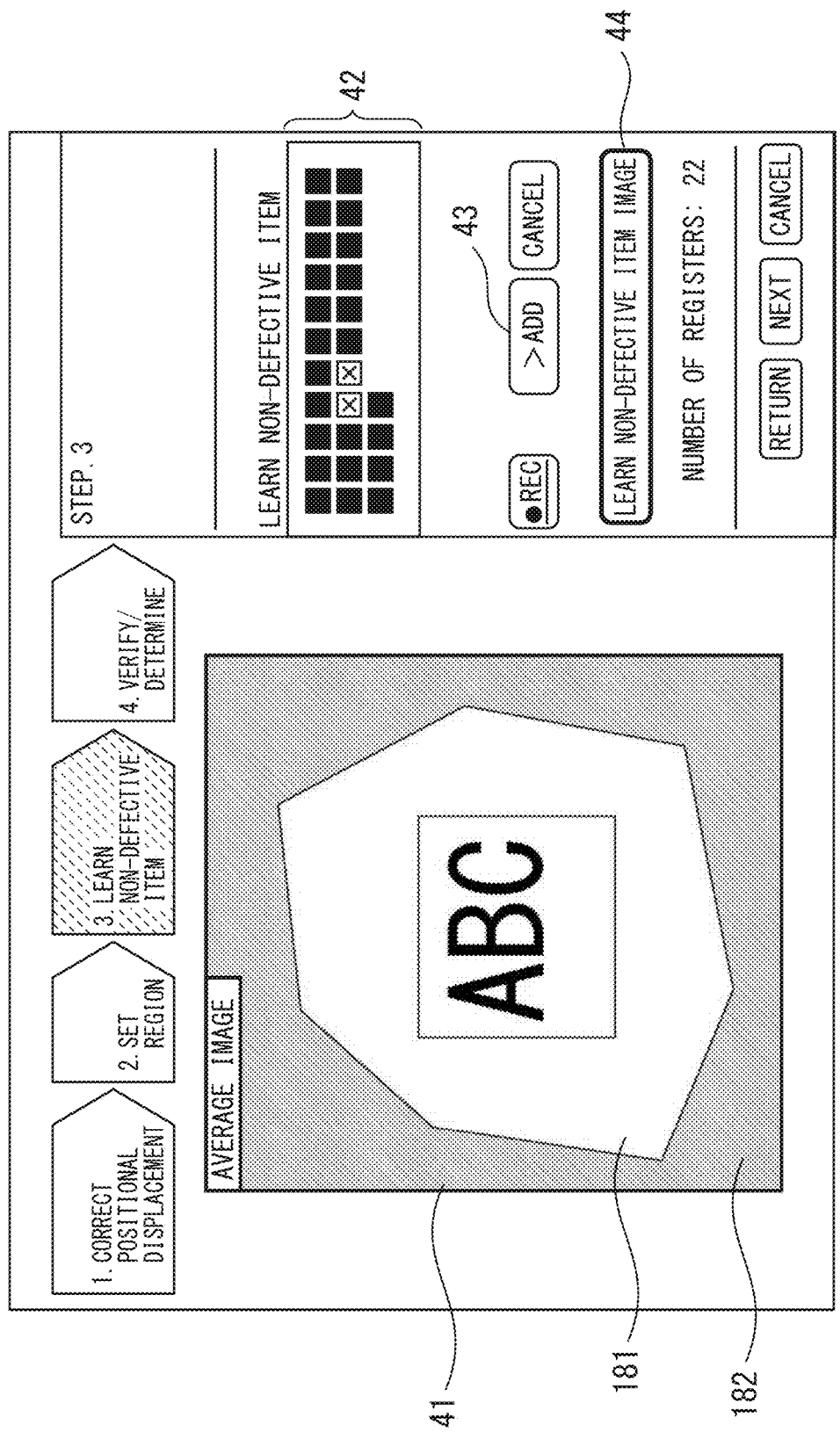
FIG. 20 is an exemplary view of a non-defective item image input accepting screen after the non-defective item learning processing in the visual inspection device according to the embodiment of the present invention.

FIG. 20 is an exemplary view of a non-defective item image input accepting screen after the non-defective item learning processing in the visual inspection device 2 according to the embodiment of the present invention. In the image display region 41, an average image is displayed. In the example of FIG. 20, when inputs of a plurality of images constituting the group of images of items regarded as non-defective items are accepted, a region which is superimposed on the average image to allow calculation of the average image, namely, a region 181 common among all the non-defective item images (region where all the non-defective item images are superimposed) is displayed. In a region 182 other than the above region, the average image cannot be calculated, and hence the non-defective item learning processing cannot be performed.

That is, the region 182 not included in all the non-defective item images exists due to positional displacement, and when such a region 182 exists in a large area, the determination accuracy significantly deteriorates. Therefore, the regions 181, 182 are superimposed and displayed on the average image, thereby allowing the user to visually check the presence of the region 182 where the average image cannot be calculated, so as to prevent deterioration in determination accuracy.

Figure 21:
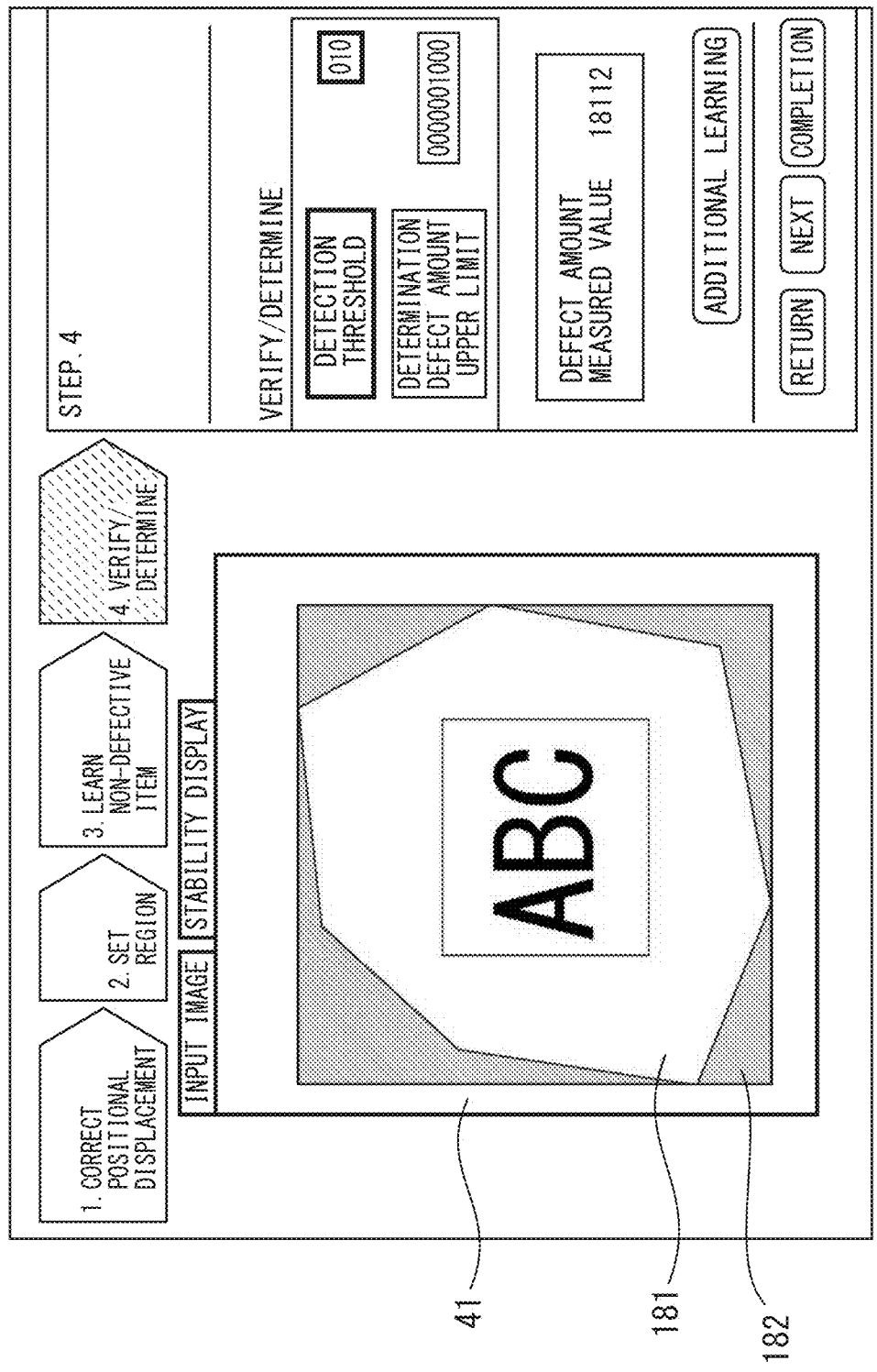
FIG. 21 is another exemplary view of a display screen for a result of the non-defective item learning processing in the visual inspection device according to the embodiment of the present invention.

Further, FIG. 21 is another exemplary view of a display screen for a result of the non-defective item learning processing in the visual inspection device 2 according to the embodiment of the present invention. In the example of FIG. 21, the region 182 other than the region 181 common among all the non-defective item images (region where all the non-defective item images are superimposed) is displayed which is essentially not preferably displayed. In this case, a devise such as a change in display of the region 182 is performed, so that inclusion of the region where the average image cannot be calculated in the region to be inspected can be visually checked, and the average image is enlarged or the like for preventing display of the region 182, whereby it is possible to reset the region to be inspected so as not to include the region 182.

Figure 22:
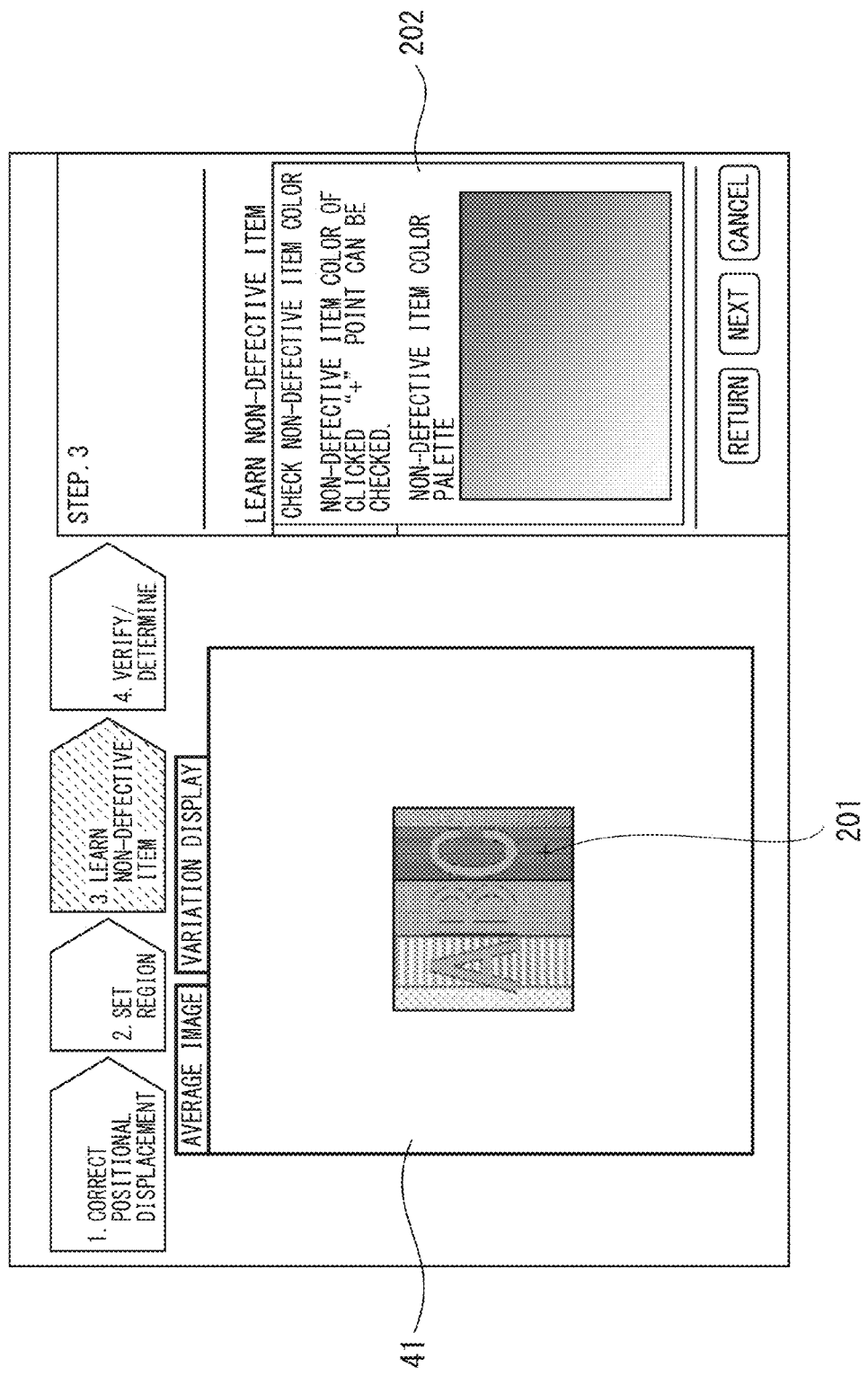
FIG. 22 is an exemplary view of a screen for checking a non-defective item color in the visual inspection device according to the embodiment of the present invention.

Further, by displaying variations in color, what color has been determined to be a color of a non-defective item may be visually checked. FIG. 22 is an exemplary view of a screen for checking a non-defective item color in the visual inspection device 2 according to the embodiment of the present invention.

As shown in FIG. 22, one point on an average image on color display made in the image display region 41 is selected. It is assumed that a "+" point 201 has been selected in FIG. 22. When the "+" point 201 is selected, a non-defective item color of the "+" point 201 is displayed in a non-defective item color display region (non-defective item color display part) 202. Visually checking the color displayed in the non-defective item color display region 202 can facilitate checking as to whether or not a color of a defective portion is included in the non-defective item colors, so as to verify whether or not learned difference processing has been correctly performed.

Figure 23A:
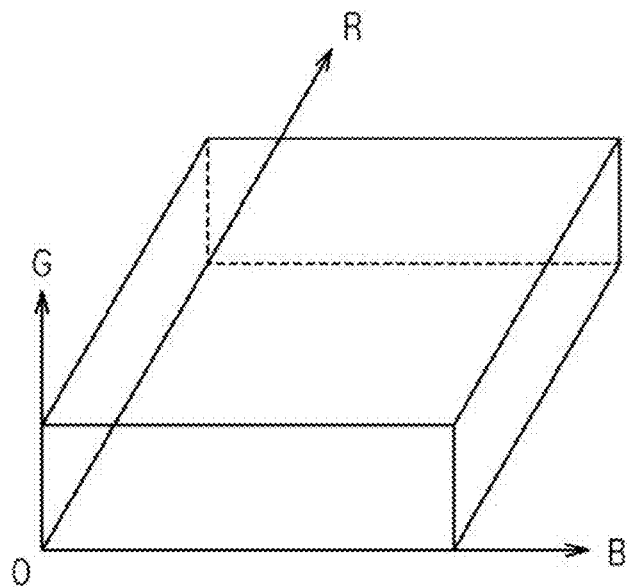
FIGS. 23A and 23B are exemplary diagrams of a non-defective item color deciding method in the visual inspection device according to the embodiment of the present invention.
Figure 23B:
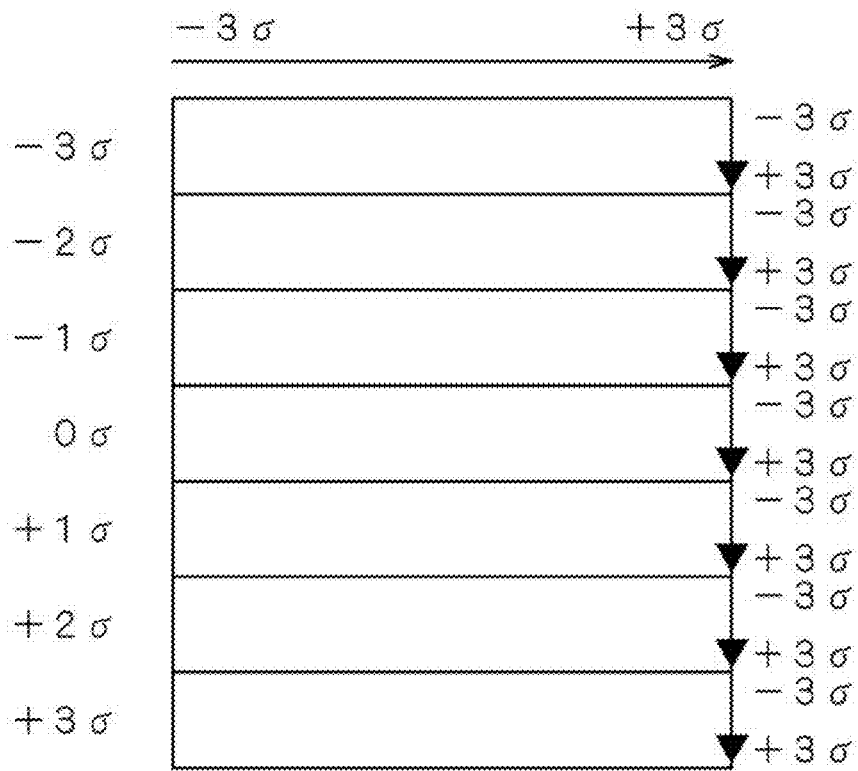

The non-defective item color is mapped from a Mahalanobis color space to a two-dimensional color space. FIGS. 23A and 23B are exemplary diagrams of a non-defective item color deciding method in the visual inspection device 2 according to the embodiment of the present invention. FIG. 23A is an exemplary view of a Mahalanobis color space. An R-axis, a G-axis, and a B-axis shown in FIG. 23A are taken, and parameters from −3σ to 3σ are allocated in the respective axis directions.

FIG. 23B is a diagram showing correspondence between the parameters and colors displayed in the screen. The R-axis is mapped on a horizontal axis of FIG. 23B, the B-axis is mapped on each section obtained by division into seven sections in a vertical direction, and the G-axis is mapped on a vertical axis, to thereby two-dimensionally display spreading of the Mahalanobis space three-dimensionally obtained by means of the R-axis, the G-axis, and the B-axis. A color gradation displayed in the FIG. 23B is displayed in the non-defective item color display region 202. Although the respective axes of the rectangular parallelepiped of the Mahalanobis space are parallel to the R-axis, the G-axis, and the B-axis, they are not necessarily parallel.

It is to be noted that the present invention is not limited to the above embodiment, and a variety of changes, modifications, and the like can be made as long as it is within the scope of the gist of the present invention. For example, the camera 1, the display device 3, and the like may be integrated with the visual inspection device 2, or may be separated therefrom.

What is claimed is:

1. A visual inspection device which makes a non-defective/defective determination by use of an inspection image of an inspection object and a determination threshold, the device comprising:
    a camera capturing the inspection image;
    a storing unit storing the inspection image acquired by the camera; and
    a control unit making the non-defective/defective determination by comparing a result of image processing with the inspection image stored in the storing unit with the determination threshold; wherein the control unit includes:
    an image input accepting unit accepting inputs of a plurality of candidate images to constitute a group of images of items as non-defective items and storing these candidate images in the storing unit;
    a threshold setting unit setting a defect threshold for determining whether each candidate image has a defective portion based on a plurality of pixel values to be extracted from corresponding regions among the plurality of stored candidate images;
    a defect amount calculating unit detecting the defective portion with respect to each of the plurality of stored candidate images based on the set defect threshold and calculating a defect amount corresponding to a pixel value or an area of the detected defective portion;
    an outlier testing unit testing by statistical processing whether or not each of the defect amounts calculated by the defect amount calculating unit is an outlier; and
    an information displaying unit displaying and outputting outlier information for specifying from among the plurality of stored candidate images a non-candidate image to be eliminated from the group of images of items as non-defective items, the non-candidate image having the defect amount tested to be the outlier by the outlier testing unit; wherein
    the threshold setting unit resets the defect threshold based on the plurality of stored candidate images except the non-candidate image from the group of images of items as non-defective items, and sets the determination threshold as a standard to be compared with the defect amount calculated based on the reset defect threshold.

2. The visual inspection device according to claim 1, comprising
    a selection accepting unit accepting selection of an image to be deleted from the group of images of items regarded as non-defective items.

3. The visual inspection device according to claim 1, wherein the outlier testing unit performs testing by use of at least one of a parametric technique and a non-parametric technique.

4. The visual inspection device according to claim 1, wherein the outlier testing unit performs testing by use of both a parametric technique and a non-parametric technique.

5. The visual inspection device according to claim 1, wherein the defect amount calculating unit calculates the defect amount as a concentration integrated value obtained by summing up difference concentrations included in a continuous region whose concentration is larger than the defect threshold in the image.

6. The visual inspection device according to claim 1, wherein the information displaying unit displays and outputs the outlier information in descending order of the defect amount.

7. A visual inspection method executable by a visual inspection device which makes a non-defective/defective determination by use of a captured inspection image of an inspection object and a determination threshold set based on a group of images of items as non-defective items, the method comprising the steps of:
    capturing the inspection image with a camera;
    storing the inspection image acquired by the camera;
    making the non-defective/defective determination by comparing a result of image processing with the inspection image stored in the storing unit with the determination threshold;
    accepting inputs of a plurality of candidate images to constitute the group of images of items as non-defective items and storing these candidate images;
    setting a defect threshold for determining whether each candidate image has a defective portion based on a plurality of pixel values to be extracted from corresponding regions among the plurality of stored candidate images;
    detecting the defective portion with respect to each of the plurality of stored candidate images based on the set defect threshold and calculating a defect amount corresponding to a pixel value or an area of each candidate image;
    testing by statistical processing whether or not each of the defect amounts calculated is an outlier;
    displaying and outputting outlier information for specifying from among the plurality of stored candidate images a non-candidate image to be eliminated from the group of images as non-defective items, the non-candidate image having the defect amount tested to be the outlier;
    resetting the defect threshold based on the plurality of stored candidate images except the non-candidate image from the group of images of items as non-defective items; and
    setting the determination threshold as a standard to be compared with the defect amount calculated based on the reset defect threshold.

8. The visual inspection method according to claim 7, further comprising a step of accepting selection of an image and deleting from the group of images of items regarded as non-defective items.

9. The visual inspection method according to claim 7, wherein the testing is performed by use of at least one of a parametric technique and a non-parametric technique.

10. The visual inspection method according to claim 7, wherein the testing is performed by use of both a parametric technique and a non-parametric technique.

11. The visual inspection method according to claim 7, wherein the defect amount is calculated as a concentration integrated value obtained by summing up difference concentrations included in a continuous region whose concentration is larger than the defect threshold in the image.

12. The visual inspection method according to claim 7, wherein the outlier information is displayed and outputted in descending order of the defect amount.

13. A computer program that is present on a non-transitory computer-readable memory, the computer program executable by a visual inspection device which makes a non-defective/defective determination by use of an inspection image of an inspection object and a determination threshold, the computer program causing the visual inspection device to function as:
   a camera capturing the inspection image;
   a storing unit storing the inspection image acquired by the camera; and
   a control unit making the non-defective/defective determination by comparing a result of image processing with the inspection image stored in the storing unit with the determination threshold; wherein the control unit includes:
   an image input accepting unit accepting inputs of a plurality of candidate images to constitute a group of images of items as non-defective items and storing these candidate images in the storing unit;
   a threshold setting unit setting a defect threshold for determining whether each candidate image has a defective portion based on a plurality of pixel values to be extracted from corresponding regions among the plurality of stored candidate images;
   a defect amount calculating unit detecting the defective portion with respect to each of the plurality of stored candidate images based on the set defect threshold and calculating a defect amount corresponding to a pixel value or an area of the detected defective portion;
   an outlier testing unit testing by statistical processing whether or not each of the defect amounts calculated by the defect amount calculating unit is an outlier; and
   an information displaying unit displaying and outputting outlier information for specifying from among the plurality of stored candidate images a non-candidate image to be eliminated from the group of images of items as non-defective items, the non-candidate image having the defect amount tested to be the outlier by the outlier testing unit; wherein
   the threshold setting unit resets the defect threshold based on the plurality of stored candidate images except the non-candidate image from the group of images of items as non-defective items, and sets the determination threshold as a standard to be compared with the defect amount calculated based on the reset defect threshold.

14. The computer program according to claim 13, wherein the visual inspection device is caused to function as a selection accepting unit accepting selection of an image to be deleted from the group of images of items regarded as non-defective items.

15. The computer program according to claim 13, wherein the outlier testing unit is caused to function as a unit for performing testing by use of at least one of a parametric technique and a non-parametric technique.

16. The computer program according to claim 13, wherein the outlier testing unit is caused to function as a unit for performing testing by use of both a parametric technique and a non-parametric technique.

17. The computer program according to claim 13, wherein the defect amount calculating unit is caused to function as a unit for calculating the defect amount as a concentration integrated value obtained by summing up difference concentrations included in a continuous region whose concentration is larger than the defect threshold in the image.

18. The computer program according to claim 13, wherein the information displaying unit is caused to function as a unit for displaying and outputting the outlier information in descending order of the defect amount.

* * * * *